(12) United States Patent
Gan et al.

(10) Patent No.: US 12,349,064 B2
(45) Date of Patent: *Jul. 1, 2025

(54) METHOD FOR INDICATING DOWNLINK SERVICE DATA AND DEVICE

(71) Applicant: HUAWEI TECHNOLOGIES CO., LTD., Guangdong (CN)

(72) Inventors: Ming Gan, Shenzhen (CN); Jia Jia, Shenzhen (CN); Xun Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 561 days.

This patent is subject to a terminal disclaimer.

(21) Appl. No.: 17/743,335

(22) Filed: May 12, 2022

(65) Prior Publication Data
US 2022/0272632 A1 Aug. 25, 2022

Related U.S. Application Data

(63) Continuation of application No. 16/559,064, filed on Sep. 3, 2019, now Pat. No. 11,343,766, which is a
(Continued)

(30) Foreign Application Priority Data

Mar. 3, 2017 (CN) .......................... 201710124880.7

(51) Int. Cl.
H04W 52/02 (2009.01)
H04W 56/00 (2009.01)
(Continued)

(52) U.S. Cl.
CPC ... *H04W 52/0216* (2013.01); *H04W 52/0229* (2013.01); *H04W 56/001* (2013.01);
(Continued)

(58) Field of Classification Search
CPC . H04W 88/08; H04W 72/12; H04W 72/1215; H04W 48/12; H04W 52/28;
(Continued)

(56) References Cited

U.S. PATENT DOCUMENTS 8,538,544 B2 * 9/2013 Sivard ................ A61N 1/37223
607/32
9,525,540 B1 12/2016 Shellhammer et al.
(Continued)

FOREIGN PATENT DOCUMENTS

CN 102780785 11/2012
CN 104081875 10/2014
(Continued)

OTHER PUBLICATIONS

E. Stepanova, D. Bankov, E. Khorov and A. Lyakhov, "On the Joint Usage of Target Wake Time and 802.11ba Wake-Up Radio, " in IEEE Access, vol. 8, pp. 221061-221076, 2020, doi: 10.1109/ACCESS.2020.3043535. (Year: 2020).*
(Continued)

*Primary Examiner* — William D Cumming
(74) *Attorney, Agent, or Firm* — Fish & Richardson P.C.

(57) ABSTRACT

One example method includes sending, by a first station (STA), a request frame to a wireless access point (AP). The request frame includes listen interval information, the listen interval information includes duration of a first listen interval, and the first STA is equipped with main radio and a wake-up receiver. The first STA receives a response frame sent by the AP, where the response frame carries an identity allocated by the AP to the first STA, and the identity of the first STA comprises an identity of the wake-up receiver of the first STA. The first STA controls the wake-up receiver to wake up within the first listen interval, and receives a wake-up beacon frame periodically sent by the AP.

20 Claims, 6 Drawing Sheets

Related U.S. Application Data continuation of application No. PCT/CN2018/077382, filed on Feb. 27, 2018.

(51) Int. Cl.
- *H04W 72/23* (2023.01)
- *H04W 84/12* (2009.01)
- *H04W 88/08* (2009.01)

(52) U.S. Cl.
CPC ........... *H04W 72/23* (2023.01); *H04W 88/08* (2013.01); *H04W 84/12* (2013.01)

(58) Field of Classification Search
CPC ......... H04W 52/0216; H04W 52/0229; H04W 40/244
USPC .................................. 455/39, 558.1, 574
See application file for complete search history.

(56) References Cited

U.S. PATENT DOCUMENTS

| | | | |
|---|---|---|---|
| 10,939,371 B2* | 3/2021 | Gucea | H04W 40/244 |
| 11,044,672 B2* | 6/2021 | Guo | H04W 52/0229 |
| 11,343,766 B2* | 5/2022 | Gan | H04W 72/12 |
| 2006/0116744 A1* | 6/2006 | Von Arx | A61N 1/37276 607/60 |
| 2006/0229053 A1* | 10/2006 | Sivard | A61N 1/378 455/574 |
| 2010/0097969 A1 | 4/2010 | Kimpe et al. | |
| 2010/0150042 A1 | 6/2010 | Oh et al. | |
| 2011/0319072 A1* | 12/2011 | Ekici | H04W 48/18 455/553.1 |
| 2012/0099497 A1* | 4/2012 | Vaidya | G06F 1/3203 370/311 |
| 2013/0225068 A1* | 8/2013 | Kiminki | H04W 72/1215 455/39 |
| 2014/0112226 A1 | 4/2014 | Jafarian et al. | |
| 2014/0334368 A1 | 11/2014 | Zhou et al. | |
| 2015/0043558 A1 | 2/2015 | Choi et al. | |
| 2015/0128263 A1 | 5/2015 | Raugas et al. | |
| 2015/0163666 A1 | 6/2015 | Jeong et al. | |
| 2015/0208436 A1 | 7/2015 | Seok | |
| 2015/0215867 A1 | 7/2015 | Choi et al. | |
| 2016/0057703 A1 | 2/2016 | Benoit et al. | |
| 2016/0374022 A1 | 12/2016 | Ang et al. | |
| 2018/0110000 A1 | 4/2018 | Shellhammer et al. | |
| 2018/0115952 A1 | 4/2018 | Shellhammer et al. | |
| 2018/0255515 A1 | 9/2018 | Hyde et al. | |
| 2019/0014541 A1 | 1/2019 | Li et al. | |
| 2019/0394726 A1* | 12/2019 | Gan | H04W 88/08 |
| 2020/0045635 A1 | 2/2020 | Lin et al. | |
| 2020/0053648 A1* | 2/2020 | Guo | H04W 52/28 |
| 2020/0107260 A1* | 4/2020 | Gucea | H04W 52/0216 |
| 2022/0272632 A1* | 8/2022 | Gan | H04W 88/08 |

FOREIGN PATENT DOCUMENTS

| | | | | |
|---|---|---|---|---|
| CN | 104737597 | | 6/2015 | |
| CN | 104756560 | | 7/2015 | |
| CN | 105794262 | | 7/2016 | |
| CN | 108541047 B | * | 7/2021 | ........ H04W 52/0216 |
| CN | 113613316 A | * | 11/2021 | ........ H04W 52/0216 |
| CN | 113613316 B | * | 11/2022 | ........ H04W 52/0216 |
| EP | 3582556 A1 | * | 12/2019 | ........ H04W 52/0216 |
| EP | 3582556 A4 | * | 1/2020 | ........ H04W 52/0216 |
| EP | 3582556 B1 | * | 2/2022 | ........ H04W 52/0216 |
| EP | 4037386 A1 | * | 8/2022 | ........ H04W 52/0216 |

OTHER PUBLICATIONS

Extended European Search Report issued in European Application No. 18761138.9 on Dec. 10. 2019, 9 pages.

Intel Corporation, "LP-WUR (Low-Power Wake-Up Receiver): Enabling Low-Power and Low-Latency Capability for 802.11" IEEE 802. 11-16/0027r0, IEEE Draft; IEEE-SA Mentor, vol. 802.11 LRLP, XP068104 775, Jan. 18, 2016, 21 pages.

Office Action issued in Chinese Application No. 201710124880.7 on Jan. 9, 2020, 18 pages (with English translation).

Office Action issued in Chinese Application No. 201710124880.7 on May 15, 2020, 12 pages (With English Translation).

Office Action issued in Chinese Application No. 202110793432.2 on Mar. 23, 2022, 9 pages.

PCT International Search Report and Written Opinion issued in International Application No. PCT/CN2018/077382 on May 18, 2018, 20 pages (with English translation).

Office Action issued in Chinese Application No. 202110793432.2 on Aug. 31, 2022, 4 pages.

* cited by examiner

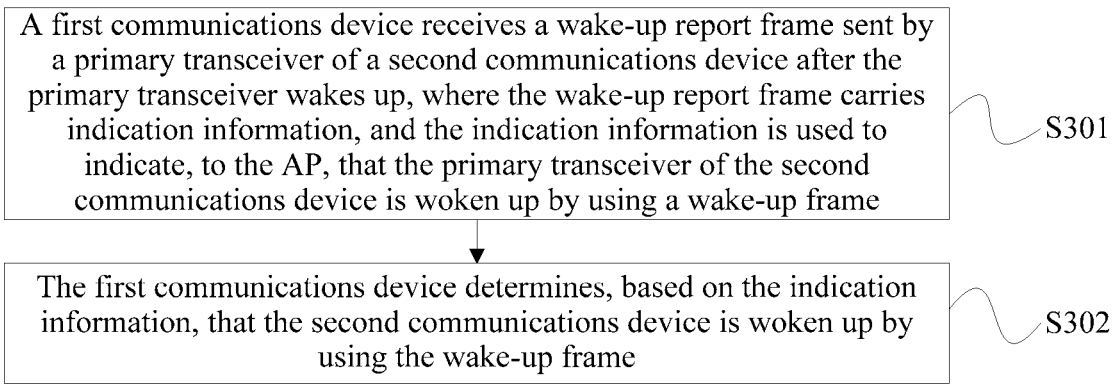
FIG. 6
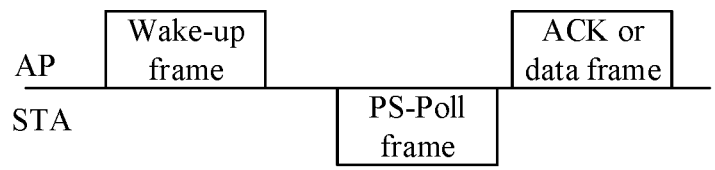
FIG. 7A
| Frame control | Association identifier | Basic service set identifier (receiver address) | Transmitter address | Frame check sequence |
FIG. 7B
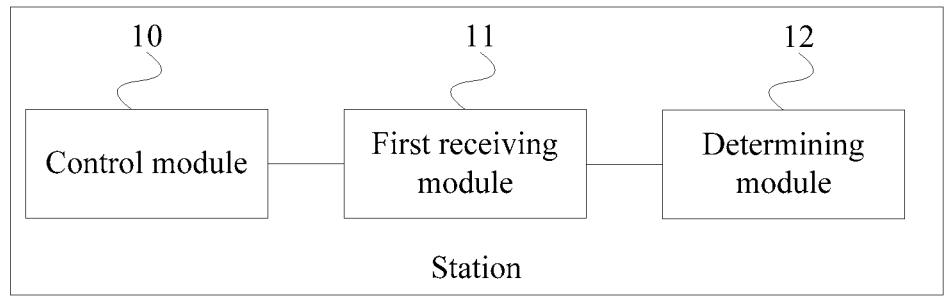
FIG. 8

METHOD FOR INDICATING DOWNLINK SERVICE DATA AND DEVICE

CROSS-REFERENCE TO RELATED APPLICATIONS

This application is a continuation of U.S. patent application Ser. No. 16/559,064, filed on Sep. 3, 2019, which is a continuation of International Application No. PCT/CN2018/077382, filed on Feb. 27, 2018. The International Application claims priority to Chinese Patent Application No. 201710124880.7, filed on Mar. 3, 2017. All of the aforementioned patent applications are hereby incorporated by reference in their entireties.

TECHNICAL FIELD

Embodiments of this application relate to communications technologies, and in particular, to a method for indicating downlink service data and a device.

BACKGROUND

In a wireless-fidelity (Wireless-Fidelity, Wi-Fi for short) network, a receive end device wastes a considerable amount of energy on idle listening (idle listening) when no signal is to be received. To be specific, if a station (Station, STA for short) continuously listens on a channel when no message is to be received or sent, a large amount of energy is consumed. Therefore, a sleep schedule (sleep schedule) is introduced in a communication standard to enable the STA to enter a deep sleep (deep sleep) state when no data is to be received or sent, so as to reduce energy consumption of continuous listening. However, when the STA is in deep sleep, an access point (Access Point, AP for short) cannot communicate with the STA, and transmission between the AP and the STA cannot be performed until the STA wakes up. This may result in a specific latency (latency). To avoid a high latency caused by the sleep schedule, the STA usually follows a specific sleep policy to periodically wake up to check whether data needs to be received. However, this reduces sleep efficiency of the STA.

Therefore, in addition to the foregoing optimized sleep policy, another technical approach to reduce energy waste resulting from idle listening of the device is to use a wake-up receiver (WUR). A core idea of the technical approach is that: in addition to a conventional 802.11 primary transceiver, a low power wake-up receiver (Wake-up Receiver, WUR for short) is added to the receive end device. The conventional 802.11 primary transceiver module is 802.11 main radio (Main Radio, MR for short) and includes both a primary transmitter and a primary receiver, as shown in FIG. 1. A station equipped with a WUR increases sleep time of MR as much as possible, to achieve an optimal energy saving effect. However, according to an existing 802.11 protocol, the MR of the station equipped with the WUR needs to wake up within a listen interval (listen interval) negotiated with an AP, to listen for a beacon (beacon) frame sent by the AP, thereby obtaining significant basic service set (Basic Service Set, BSS for short) parameter information broadcast by the AP, for example, an indication whether the AP has downlink service data to be sent to the station. If the station wake up (that is, if the MR of the station wakes up) and obtains through listening that the beacon frame sent by the AP includes the indication that the AP has downlink service data to be sent to the station, the station returns to a sleep state briefly, independently selects time to wake up, and then sends a power save poll (Power save poll, PS-poll for short) frame to the AP to notify the AP that the station is in an awake state and that the AP can send downlink service data to the station. Alternatively, after listening for the indication of the beacon frame, the station does not return to a sleep state, but directly sends a PS-poll frame to the AP to enable the AP to send downlink service data. Duration of the foregoing listen interval is used to inform the AP of frequency with which the primary transceiver of the station equipped with the WUR wakes up to receive a beacon frame, that is, the primary transceiver of the station wakes up once within each listen interval to receive a beacon frame.

However, for some stations that are equipped with WURs and that are very sensitive to power consumption, for example, stations (for example, sensors) equipped with coin batteries, a percentage of downlink service data sent by the AP to the stations of this type in entire transmitted service data is very small, and if MR of the stations equipped with the WURs wakes up to receive a beacon frame within a listen interval according to the 802.11 protocol, the MR wakes up relatively frequently. Consequently, power consumption of the stations is relatively high.

SUMMARY

This application provides a method for indicating downlink service data and a device, so as to resolve a technical problem in the prior art that MR wakes up so frequently that power consumption of a station is relatively high.

According to a first aspect, this application provides a method for indicating downlink service data, including:
  controlling, by a first station (STA) associated with a radio access point (AP), a wake-up receiver of the first station (STA) to wake up within a preset first listen interval, and receive a wake-up beacon frame sent by the AP, where the wake-up beacon frame includes an indication field used to indicate whether the AP has downlink service data to be sent to the first STA;
  controlling, by the first STA, main radio (MR) of the first STA not to wake up within a second listen interval to receive a beacon frame sent by the AP; and
  determining, by the first STA based on the indication field, whether the AP has downlink service data to be sent to the first STA.

According to the method for indicating downlink service data provided in the first aspect, the AP determines a STA equipped with a wake-up receiver from an associated STA, and then periodically sends the wake-up beacon frame to the WUR of the STA equipped with the wake-up receiver, where the wake-up beacon frame includes the indication field used to indicate whether there is downlink service data for the first STA, and the indication field includes only the downlink service data indication for one or more first STAs of the STA that is associated with the AP and that is equipped with the wake-up receiver. Then, the first STA controls the WUR of the first STA to wake up within the preset first listen interval and receive the wake-up beacon frame, and controls the MR of the first STA not to wake up within the second listen interval (that is, a listen interval specified in an 802.11 protocol) to receive an 802.11 beacon frame sent by the AP. The first STA can determine, based only on the indication field in the wake-up beacon frame, whether the AP has downlink service data to be sent to the first STA. That is, in this application, for indicating to the first STA whether the AP has downlink service data to be sent to the first STA, the first STA may learn of the downlink service data indication for the first STA based only on the wake-up beacon frame sent by the AP, and the MR of the first STA does not need to wake up within the second listen interval to receive the beacon frame broadcast by the AP, but only needs to be woken up by the WUR of the first STA when the WUR of the first STA learns, based on the wake-up beacon frame obtained through listening, that the AP has downlink service data to be sent to the first STA. This significantly reduces wake-up frequency of the MR and reduces power consumption of the first STA. In addition, the indication field of the wake-up beacon frame in this application includes only the downlink service data indication for the first STA, and therefore even if a transmission rate of the WUR is relatively low, transmission of the indication field can be completed during one transmission opportunity preempted by the AP. In other words, transmission time of the wake-up beacon frame is relatively short and transmission efficiency is high.

In a possible design, the method further includes:
sending, by the first STA, an association request frame to the AP; and
receiving, by the first STA, an association response sent by the AP, where the association response carries an identifier allocated by the AP to the first STA, and identifiers allocated by the AP to one or more first STAs are consecutive.

In a possible design, the indication field specifically includes a bitmap control field and a partial virtual bitmap field, where
each bit in the partial virtual bitmap field is used to indicate whether there is downlink service data for a first STA corresponding to the bit; and
the bitmap control field is used to indicate an offset of a current first bit in the partial virtual bitmap field, where the offset is used to indicate a difference between an identifier of a first STA corresponding to the current first bit in the partial virtual bitmap field and an identifier of a $1^{st}$ first STA in the first STAs with consecutive identifiers.

According to the method for indicating downlink service data provided in the possible design, the AP allocates, by using the association response, the identifier to the first STA associated with the AP, and the identifiers allocated by the AP to all the first STAs are consecutive, so that when obtaining through listening the wake-up beacon frame including the bitmap control field and the partial virtual bitmap field, the first STA can learn of the offset of the current first bit in the partial virtual bitmap field based on the bitmap control field, then determine, based on the offset, a location of an indication bit corresponding to the first STA in the partial virtual bitmap field, and determine the identifier of the first STA corresponding to the current first bit in the partial virtual bitmap field. This improves efficiency of identifying, by the first STA, the indication bit corresponding to the first STA.

According to a second aspect, this application provides a method for indicating downlink service data, including:
determining, by a radio access point (AP), a station (STA) that is associated with the AP and that is equipped with a wake-up receiver, where the STA includes a first STA; and
periodically sending, by the AP, a wake-up beacon frame to the wake-up receiver of the STA, where the wake-up beacon frame includes an indication field used to indicate whether the AP has downlink service data to be sent to the first STA.

In a possible design, the method further includes:
receiving, by the AP, an association request frame sent by the first STA; and sending, by the AP, an association response to the first STA, where the association response carries an identifier allocated by the AP to the first STA, and identifiers allocated by the AP to one or more first STAs are consecutive.

In a possible design, the indication field specifically includes a bitmap control field and a partial virtual bitmap field, where
each bit in the partial virtual bitmap field is used to indicate whether there is downlink service data for a first STA corresponding to the bit; and
the bitmap control field is used to indicate an offset of a current first bit in the partial virtual bitmap field, where the offset is used to indicate a difference between an identifier of a first STA corresponding to the current first bit in the partial virtual bitmap field and an identifier of a $1^{st}$ first STA in the first STAs with consecutive identifiers.

For beneficial effects of the method provided in the second aspect and the possible designs of the second aspect, refer to the beneficial effects brought by the first aspect and the possible designs of the first aspect. Details are not described herein again.

With reference to the first aspect and the possible designs of the first aspect, and the second aspect and the possible designs of the second aspect, in a possible design, the method further includes:
receiving, by the AP, listen interval information sent by the first STA, where the listen interval information includes a start point of a first listen interval and duration of the first listen interval, and the start point of the first listen interval is time at which a wake-up receiver of the first STA receives the wake-up beacon frame for the last time during a last wake-up period.

In a possible design, the identifier of the first STA includes any one of an identifier of the wake-up receiver of the first STA, and an association identifier of main radio (MR) of the first STA.

In a possible design, one or more bytes indicating the first listen interval includes M normalized bits and N non-normalized bits, where a value corresponding to the M normalized bits is used to indicate a basic unit of the first listen interval, and a value corresponding to the N non-normalized bits is used to indicate a quantity of basic units of the first listen interval; and
the duration of the first listen interval is equal to a product of the quantity of basic units of the first listen interval and the basic unit of the first listen interval.

According to the method provided in the foregoing designs, the first STA sends the listen interval information to the AP at an association stage by using the association request frame, and in the listen interval information, the start point of the first listen interval is the time at which the wake-up receiver of the first STA receives the wake-up beacon frame for the last time during the last wake-up period, so that the AP can determine, based on the listen interval information, a lifecycle of downlink service data to be sent to the first STA, thereby better managing a data buffer space of the AP. In addition, in this application, duration of an original 802.11 listen interval (that is, a foregoing second listen interval) is extended. To be specific, in this application, the basic unit of the first listen interval is increased by using the categorized normalized bits, so that the duration of the first listen interval is increased. In other words, the duration of the first listen interval provided in this application is greater than the duration of the 802.11 listen interval. Therefore, the wake-up receiver of the first STA does not need to wake up frequently, and power consumption of the first STA is further reduced.

According to a third aspect, this application provides an information indication method, including:

receiving, by a first communications device, a wake-up report frame sent by a primary transceiver of a second communications device after the primary transceiver wakes up, where the wake-up report frame carries indication information, and the indication information is used to indicate, to the AP, that the primary transceiver of the second communications device is woken up by using a wake-up frame; and determining, by the first communications device based on the indication information, that the second communications device is woken up by using the wake-up frame.

According to the information indication method provided in the third aspect, the second communications device sends, to the first communications device after waking up, the wake-up report frame that carries the indication information, and the first communications device may determine, based on the wake-up report frame, that the second communications device is woken up by using the wake-up frame, so that the first communications device can accurately learn of an attribute of an awake state of the second communications device, and more properly and effectively control data communication between the first communications device and the second communications device. Further, the indication information in the wake-up report frame may also implicitly enable the first communications device to determine, based on the awake state of the second communications device, whether the second communications device is attacked, so that the first communications device can respond with protection measures in time to prevent the MR from waking up by mistake when the second communications device is attacked again, thereby saving energy of the second communications device.

In a possible design, the wake-up report frame further includes characteristic information of the wake-up frame, and the method further includes:

determining, by the first communications device based on the characteristic information of the wake-up frame, whether the wake-up frame is a wake-up frame sent by the first communications device.

According to the method provided in the possible design, the wake-up report frame sent to the first communications device carries the indication information and the characteristic information of the wake-up frame, so that the first communications device can learn, based on the wake-up report frame, whether the second communications device that currently sends the wake-up report frame is attacked by a pseudo station, and after determining that the station that sends the wake-up report frame is attacked by a pseudo station, the first communications device responds with protection measures in time to prevent the MR from waking up by mistake when the second communications device is attacked again, thereby saving energy of the second communications device.

According to a fourth aspect, to implement the method for indicating downlink service data in the first aspect, an embodiment of this application provides a station, where the station is a first STA of a station associated with an access point (AP), and the first STA has a function of implementing the foregoing method for indicating downlink service data. The function may be implemented by hardware, or may be implemented by executing corresponding software by hardware. The hardware or the software includes one or more modules corresponding to the function.

In a possible implementation of the fourth aspect, the first station includes a plurality of function modules or units, configured to implement the method for indicating downlink service data in the first aspect.

In another possible implementation of the fourth aspect, the first station may include a processor, and a receiver and a transmitter (or a transceiver). The processor is configured to support the device in performing a corresponding function in the method for indicating downlink service data in the first aspect. The transceiver is configured to support communication between the device and another network device or terminal device, and may be, for example, a corresponding radio frequency module or baseband module. The device may further include a memory, where the memory is configured to be coupled to the processor, and stores a program instruction and data that are necessary for the first station to perform the foregoing method for indicating downlink service data.

According to a fifth aspect, to implement the method for indicating downlink service data in the second aspect, an embodiment of this application provides a radio access point (AP), where the AP has a function of implementing the foregoing method for indicating downlink service data. The function may be implemented by hardware, or may be implemented by executing corresponding software by hardware. The hardware or the software includes one or more modules corresponding to the function.

In a possible implementation of the fifth aspect, the AP includes a plurality of function modules or units, configured to implement the method for indicating downlink service data in the second aspect.

In another possible implementation of the fifth aspect, the AP may include a processor, and a receiver and a transmitter (or a transceiver). The processor is configured to support the AP in performing a corresponding function in the method for indicating downlink service data in the second aspect. The transceiver is configured to support communication between the AP and a transmit end device, and may be, for example, a corresponding radio frequency module or baseband module. The AP may further include a memory, where the memory is configured to be coupled to the processor, and stores a program instruction and data that are necessary for the AP to perform the foregoing method for indicating downlink service data.

According to a sixth aspect, to implement the information indication method in the third aspect, an embodiment of this application provides a communications device, where the communications device is a first communications device, and optionally, the first communications device may be an AP, or may be a STA. The first communications device has a function of implementing the foregoing information indication method. The function may be implemented by hardware, or may be implemented by executing corresponding software by hardware. The hardware or the software includes one or more modules corresponding to the function.

In a possible implementation of the sixth aspect, the first communications device includes a plurality of function modules or units, configured to implement the information indication method in the third aspect.

In another possible implementation of the sixth aspect, the first communications device may include a processor, and a receiver and a transmitter (or a transceiver). The processor is configured to support the device in performing a corresponding function in the information indication method in the third aspect. The transceiver is configured to support communication between the device and a transmit end device, and may be, for example, a corresponding radio frequency module or baseband module. The device may further include a memory, where the memory is configured to be coupled to the processor, and stores a program instruction and data that are necessary for the first communications device to perform the foregoing information indication method.

According to a seventh aspect, an embodiment of this application provides a computer storage medium, configured to store a computer software instruction used by the foregoing first STA. The computer storage medium includes a program designed for executing the first aspect.

According to an eighth aspect, an embodiment of this application provides a computer storage medium, configured to store a computer software instruction used by the foregoing AP. The computer storage medium includes a program designed for executing the second aspect.

According to a ninth aspect, an embodiment of this application provides a computer storage medium, configured to store a computer software instruction used by the foregoing first communications device. The computer storage medium includes a program designed for executing the third aspect.

According to a tenth aspect, an embodiment of this application provides a computer program product, where the computer program product includes an instruction, and when the computer program product is executed by a computer, the instruction enables the computer to perform the functions executed by the first STA in the foregoing method.

According to an eleventh aspect, an embodiment of this application provides a computer program product, where the computer program product includes an instruction, and when the computer program product is executed by a computer, the instruction enables the computer to perform the functions executed by the AP in the foregoing method.

According to a twelfth aspect, an embodiment of this application provides a computer program product, where the computer program product includes an instruction, and when the computer program product is executed by a computer, the instruction enables the computer to perform the functions executed by the first communications device in the foregoing method.

Compared with that in the prior art, according to the method for indicating downlink service data and the device provided in this application, the AP determines the STA equipped with the wake-up receiver from the associated STA, and then periodically sends the wake-up beacon frame to the WUR of the STA equipped with the wake-up receiver, where the wake-up beacon frame includes the indication field used to indicate whether there is downlink service data for the first STA, and the indication field includes only the downlink service data indication for the first STA of the STA that is associated with the AP and that is equipped with the wake-up receiver. Then, the first STA controls the WUR of the first STA to wake up within the preset first listen interval and receive the wake-up beacon frame, and controls the MR of the first STA not to wake up within the second listen interval (that is, the listen interval specified in the 802.11 protocol) to receive the 802.11 beacon frame sent by the AP. The first STA can determine, based only on the indication field in the wake-up beacon frame, whether the AP has downlink service data to be sent to the first STA. That is, in this application, for indicating to the first STA whether the AP has downlink service data to be sent to the first STA, the first STA may learn of the downlink service data indication for the first STA based only on the wake-up beacon frame sent by the AP, and the MR of the first STA does not need to wake up within the second listen interval to receive the beacon frame broadcast by the AP, but only needs to be woken up by the WUR of the first STA when the WUR of the first STA learns, based on the wake-up beacon frame obtained through listening, that the AP has downlink service data to be sent to the first STA. This significantly reduces wake-up frequency of the MR and reduces power consumption of the first STA. In addition, the indication field of the wake-up beacon frame in this application includes only the downlink service data indication for the first STA, and therefore even if a transmission rate of the WUR is relatively low, transmission of the indication field can be completed during one transmission opportunity preempted by the AP. In other words, transmission time of the wake-up beacon frame is relatively short and transmission efficiency is high.

DESCRIPTION OF DRAWINGS

FIG. 6 is a schematic flowchart of an embodiment of an information indication method according to this application;

FIG. 7A is a schematic diagram of a passive wake-up process of MR according to this application;

FIG. 7B is a schematic structural diagram of a PS-poll frame according to this application;

FIG. 8 is a schematic structural diagram of a station according to an embodiment of this application;

DESCRIPTION OF EMBODIMENTS

This application may be applied to a wireless local area network (Wireless Local Area Network, WLAN for short). The WLAN currently uses institute of electrical and electronics engineers (Institute of Electrical and Electronics Engineers, IEEE for short) 802.11 family of standards. A station (Station, STA for short) and an access point (Access Point, AP for short) are basic components of the WLAN.

The AP is severed for a mobile user to access a wired network. The AP is mainly deployed in home, inside a building, and inside a park, and has a typical coverage radius of tens to hundreds of meters. Certainly, the AP may also be deployed outdoors. An AP is equivalent to a bridge that connects a wired network and a wireless network. A major function of the AP is to connect various wireless network clients and connect the wireless network to Ethernet. Specifically, the AP may be a terminal device or a network device with a Wi-Fi (English: Wireless Fidelity, Chinese: wireless fidelity) chip. Optionally, the AP may be a device that supports an 802.11ax standard. Further, optionally, the AP may be a device that supports a plurality of WLAN standards, such as 802.11ac, 802.11n, 802.11g, 802.11b, and 802.11a. In the embodiments, a type of standard supported by the AP is not limited.

The STA is usually a client device in the WLAN. The STA may be mobile or fixed, and is a basic component of the wireless local area network. The STA may be a wireless communications chip, a wireless sensor, or a wireless communications terminal. For example, the station may be a mobile phone of a Wi-Fi communication function, a tablet computer of a Wi-Fi communication function, a set top box of a Wi-Fi communication function, a smart TV of a Wi-Fi communication function, a smart wearable device of a Wi-Fi communication function, an in-vehicle communications device of a Wi-Fi communication function, or a computer of a Wi-Fi communication function.

Figure 1:
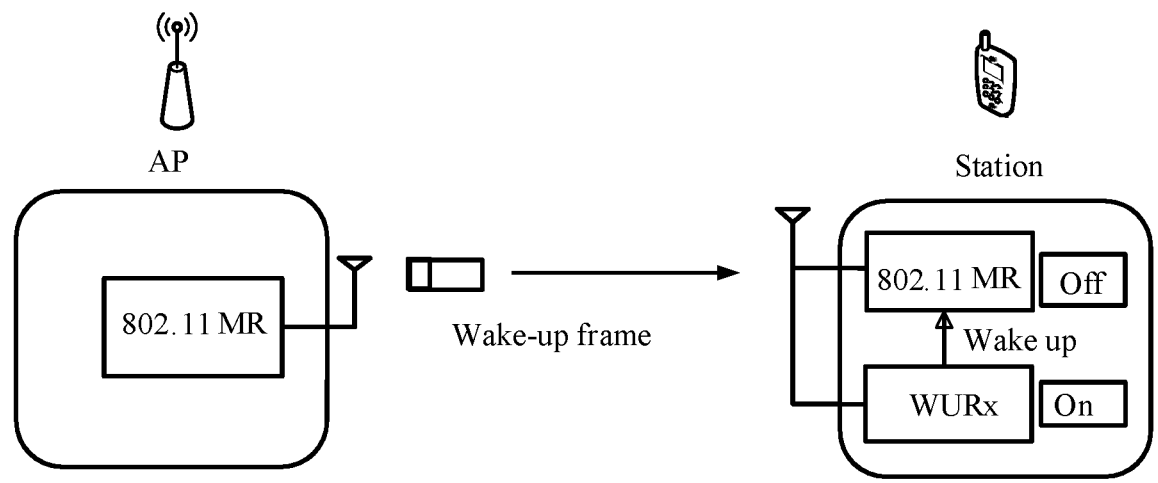
FIG. 1 is a schematic structural diagram of a station equipped with a wake-up receiver according to this application.
Figure 2:
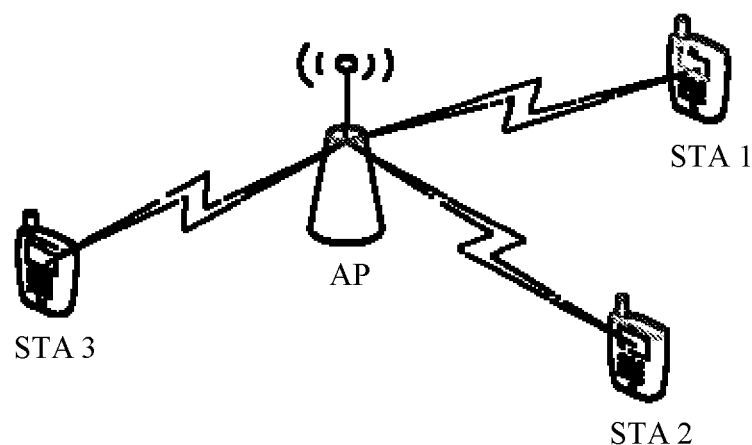
FIG. 2 is a schematic structural diagram of a WLAN system according to this application.

FIG. 2 is a schematic structural diagram of a WLAN system according to this application. As shown in FIG. 2, one AP in the WLAN system may exchange information with a plurality of STAs (three STAs are used as an example in the figure), including a STA 1, a STA 2, and a STA 3. Certainly, as not limited thereto, one AP may also exchange information with one or more STA groups, and interaction may also be performed between a plurality of STAs. It should be noted that both a first STA and a second STA in this application are stations for which 802.11 main radio (MR) (or primary transceivers) and wake-up receivers (WURs) are configured, and structures of the first STA and the second STA are shown in FIG. 1.

In this application, MR wake-up may be classified into active wake-up and passive wake-up. In passive wake-up of MR, an AP sends a wake-up frame (also named as Wake Up Packet, WUP for short) to at least one station (STA) associated with the AP. The WUP may be used to indicate a reception parameter to be used by MR of the at least one to-be-woken-up station after the MR is woken up from a sleep state, for example, indicating a receive mode, wake-up time, and the like, and then a WUR wakes up the MR of the station after receiving the wake-up frame (WUP) sent by the AP. After the MR of the STA is woken up, the MR sends a PS-Poll frame or an acknowledgment frame to the AP to notify the AP that the MR has woken up, and then the AP returns an acknowledgment (ACK) response or directly transmits data to the MR of the station. Optionally, the AP may directly send a data frame to the MR of the station after the MR of the station is woken up, without waiting for the MR of the station to send a PS-Poll frame. Alternatively, the AP may send a request to send (request to send, RTS) message to the woken-up MR of the station, and then the MR of the station responds to the AP with a clear to send (clear to send, CTS) message. In addition, an AP may send a WUP to a non-AP station (non-AP STA), or a non-AP STA may send a WUP to an AP, and this is not limited in this application.

In one type of active wake-up of MR, a station equipped with a WUR and MR follows an energy saving mechanism in an 802.11 protocol, and within a listen interval (listen interval) negotiated with an AP, the MR of the station equipped with the WUR wakes up to listen for a beacon (beacon) frame sent by the AP (the beacon frame herein is an 802.11 beacon frame sent by the AP to the primary transceiver of the station), thereby obtaining significant basic service set (Basic Service Set, BSS for short) parameter information broadcast by the AP, for example, an indication whether the AP has downlink service data to be sent to the station. If the woken-up station (that is, the MR of the station wakes up and) obtains through listening that the beacon frame sent by the AP includes an indication that the AP has downlink service data to be sent to the station, the station returns to a sleep state briefly, independently selects time to wake up, and then sends a PS-poll frame to the AP to notify the AP that the station in already in an awake state and that the AP can send downlink service data to the station. Alternatively, after listening for the indication of the beacon frame, the station does not return to a sleep state, but directly sends a PS-poll frame to the AP to enable the AP to send downlink service data. Duration of the foregoing listen interval is used to inform the AP of frequency with which the primary transceiver of the station equipped with the WUR wakes up to receive a beacon frame, that is, the primary transceiver of the station wakes up once within each listen interval to receive a beacon frame.

However, for some stations that are equipped with WURs and that are very sensitive to power consumption, for example, stations (for example, sensors) equipped with coin batteries, a percentage of downlink service data sent by the AP to the stations of this type in entire transmitted service data is very small, and if MR of the stations equipped with the WURs wakes up to receive a beacon frame within a listen interval according to the 802.11 mechanism, the MR wakes up relatively frequently. Consequently, power consumption of the stations is relatively high.

Therefore, the embodiments of this application provide a method for indicating downlink service data and a device, so as to resolve a technical problem in the prior art that MR of some stations (for example, extreme low power stations) that are very sensitive to power consumption wakes up so frequently that power consumption of the stations is relatively high.

It should be understood that although terms such as "first", "second", and "third" may be used in the embodiments of the present invention to describe xxx, the xxx should not be limited by these terms. These terms are merely used to distinguish between the xxx. For example, without departing from the scope of the embodiments of the present invention, a first xxx may also be referred to as a second xxx, and similarly the second xxx may also be referred to as the first xxx.

Specific embodiments are used below to describe in detail the technical solutions of this application. The following several specific embodiments may be combined with each other, and a same or similar concept or process may not be described repeatedly in some embodiments.

Figure 3:
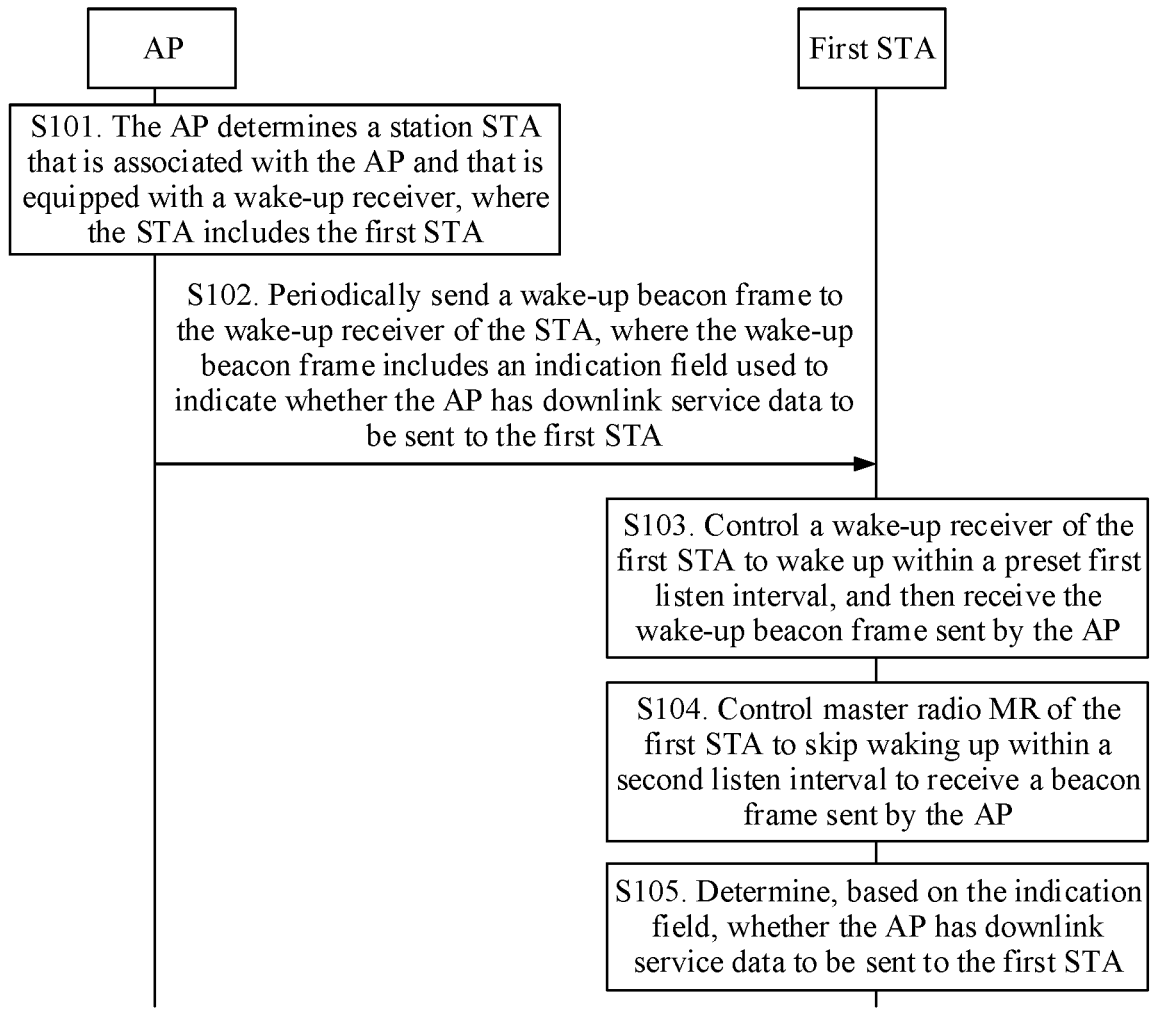
FIG. 3 is a signaling flowchart of an embodiment of a method for indicating downlink service data according to this application.

FIG. 3 is a signaling flowchart of an embodiment of a method for indicating downlink service data according to this application. This embodiment relates to a specific process in which an AP sends a wake-up beacon frame to a wake-up receiver of a station associated with the AP, so that a first STA that is associated with the AP and that is equipped with a wake-up receiver can learn, based on the wake-up beacon frame without waking up MR of the first STA to receive a beacon frame, whether the AP has downlink service data to be sent to the first STA. As shown in FIG. 3, the method includes the following steps.

S101. An AP determines a station (STA) that is associated with the AP and that is equipped with a wake-up receiver, where the STA includes a first STA.

In this embodiment, a station associated with the AP may include the STA equipped with the wake-up receiver, or may include a STA equipped with no wake-up receiver. For the STA equipped with the wake-up receiver, the AP may classify the STA equipped with the wake-up receiver into a first STA or a second STA based on a power consumption requirement of the STA or another related factor. Optionally, the AP may determine a STA whose power consumption requirement is less than a preset power consumption threshold as a first STA, and determine a STA whose power consumption requirement is greater than or equal to the preset power consumption threshold as a second STA. Certainly, power consumption requirements of all STAs that are currently associated with the AP and that are equipped with wake-up receivers may be less than the preset power consumption threshold, that is, all STAs currently associated with the AP are first STAs. Optionally, the first STA may be a station equipped with a coin battery, and the station of this type is relatively sensitive to power consumption, that is, the station of this type is an extreme low power station, and the second STA may be a low power station less sensitive to power consumption. Optionally, there may be one or more first STAs.

S102. The AP periodically sends a wake-up beacon frame to the wake-up receiver of the STA, where the wake-up beacon frame includes an indication field used to indicate whether the AP has downlink service data to be sent to the first STA.

Specifically, after determining all the STAs that are associated with the AP and that are equipped with the wake-up receivers, the AP may periodically send the wake-up beacon frame to each of the WURs of all the STAs equipped with the wake-up receivers. Further, according to an 802.11 protocol, the AP sends a beacon frame to MR of these STAs equipped with the wake-up receivers and MR of the STA equipped with no wake-up receiver, and the beacon frame is a beacon frame in the 802.11 protocol (which is referred to as an 802.11 beacon frame).

In this embodiment, the wake-up beacon frame includes the indication field used to indicate whether the AP has downlink service data to be sent to the first STA, and the indication field includes only the downlink service data indication for the first STA, and does not include either a downlink service data indication for the second STA or a downlink service data indication for the STA equipped with no wake-up receiver. After waking up to obtain through listening the wake-up beacon frame, a WUR of the first STA may learn, based on a bit corresponding to the WUR of the first STA in the indication field of the wake-up beacon frame, whether the AP has downlink service data to be sent to the first STA. The 802.11 beacon frame includes a traffic indication map (TIM) field, and the TIM field includes both the downlink service data indication for the second STA and the downlink service data indication for the first STA, and further includes the downlink service data indication for the STA equipped with no wake-up receiver (that is, the 802.11 beacon frame includes downlink service data indications for all STAs associated with the AP). Based on the foregoing example, if all (2007 in total) the STAs associated with the AP are equipped with the WURs, the TIM field of the 802.11 beacon frame includes 2007 bits, and after obtaining through listening the 802.11 beacon frame, MR of the second STA learns, based on a bit corresponding to the second STA in the TIM field, whether the AP has downlink service data to be sent to the MR of the second STA.

S103. The first STA controls the wake-up receiver of the first STA to wake up within a preset first listen interval, and then receive the wake-up beacon frame sent by the AP.

S104. The first STA controls main radio (MR) of the first STA not to wake up within a second listen interval to receive a beacon frame sent by the AP.

The second listen interval is a listen interval specified in the 802.11 protocol. In this embodiment, the first listen interval may be the same as or different from the second listen interval, and this is not limited in this embodiment.

S105. The first STA determines, based on the indication field, whether the AP has downlink service data to be sent to the first STA.

Specifically, as the AP periodically sends the wake-up beacon frame to each of the WURs of all the STAs equipped with the wake-up receivers, the first STA controls the WUR of the first STA to wake up within each preset first listen interval to listen for the wake-up beacon frame sent by the AP. After receiving the wake-up beacon frame within a wake-up period, the WUR of the first STA can learn, based on the indication field of the wake-up beacon frame, whether the AP currently has downlink service data to be sent to the first STA. In addition, the first STA controls the MR of the first STA not to wake up within the second listen interval to receive the 802.11 beacon frame sent by the AP, that is, a primary transceiver (or the main radio) of the first STA can obtain the downlink service data indication without frequently waking up to listen for the 802.11 beacon frame broadcast by the AP, and the MR only needs to be woken up by the WUR of the first STA when the WUR of the first STA learns, based on the wake-up beacon frame obtained through listening, that the AP has downlink service data to be sent to the first STA. This significantly reduces wake-up frequency of the MR and reduces power consumption of the first STA.

In addition, with reference to the description of the foregoing embodiment, if all (2007 in total) the STAs associated with the AP are equipped with the wake-up receivers (WURs), optionally, the AP classifies all the STAs into the first STA and the second STA based on the power consumption requirements of all the STAs or the another factor, and the AP sends the wake-up beacon frame to each of the wake-up receiver of the first STA and a wake-up receiver of the second STA. It is assumed that the indication field of the wake-up beacon frame includes the downlink service data indications of all the stations equipped with the wake-up receivers (there are a maximum of 2007 stations equipped with wake-up receivers). However, limited by low-power-consumption requirements and narrowband transmission of the stations equipped with the WURs, a transmission rate of the wake-up beacon frame sent by the AP is relatively low, for example, 250 Kbps, and transmission time of the wake-up beacon frame is about 8 ms. Consequently, after the AP preempts a transmission channel, transmission of the wake-up beacon frame cannot be completed during one transmission opportunity, that is, the transmission time of the wake-up beacon frame is relatively long, and air interface overheads are extremely wasted. The wake-up beacon frame provided in the present invention includes only the downlink service data indication for the first STA (that is, the indication field), when a transmission rate of the WUR is relatively low, transmission of the indication field can be completed during one transmission opportunity preempted by the AP, that is, the transmission time of the wake-up beacon frame is relatively short and transmission efficiency is high.

According to the method for indicating downlink service data provided in this application, the AP determines the STA equipped with the wake-up receiver of the associated STA, and then periodically sends the wake-up beacon frame to the WUR of the STA equipped with the wake-up receiver, where the wake-up beacon frame includes the indication field used to indicate whether there is downlink service data for the first STA, and the indication field includes only the downlink service data indication for the first STA of the STA that is associated with the AP and that is equipped with the wake-up receiver; then, the first STA controls the WUR of the first STA to wake up within the preset first listen interval and receive the wake-up beacon frame, and controls the MR of the first STA not to wake up within the second listen interval (that is, the listen interval specified in the 802.11 protocol) to receive the 802.11 beacon frame sent by the AP, and the first STA can determine, based only on the indication field of the wake-up beacon frame, whether the AP has downlink service data to be sent to the first STA. That is, in this application, for indicating to the first STA whether the AP has downlink service data to be sent to the first STA, the first STA may learn of the downlink service data indication for the first STA based only on the wake-up beacon frame sent by the AP, and the MR of the first STA does not need to wake up within the second listen interval to receive the beacon frame broadcast by the AP, but only needs to be woken up by the WUR of the first STA when the WUR of the first STA learns, based on the wake-up beacon frame obtained through listening, that the AP has downlink service data to be sent to the first STA. This significantly reduces wake-up frequency of the MR and reduces power consumption of the first STA. In addition, the indication field of the wake-up beacon frame in this application includes only the downlink service data indication for the first STA, and therefore even if the transmission rate of the WUR is relatively low, transmission of the indication field can be completed during one transmission opportunity preempted by the AP, that is, the transmission time of the wake-up beacon frame is relatively short and transmission efficiency is high.

Figure 4:
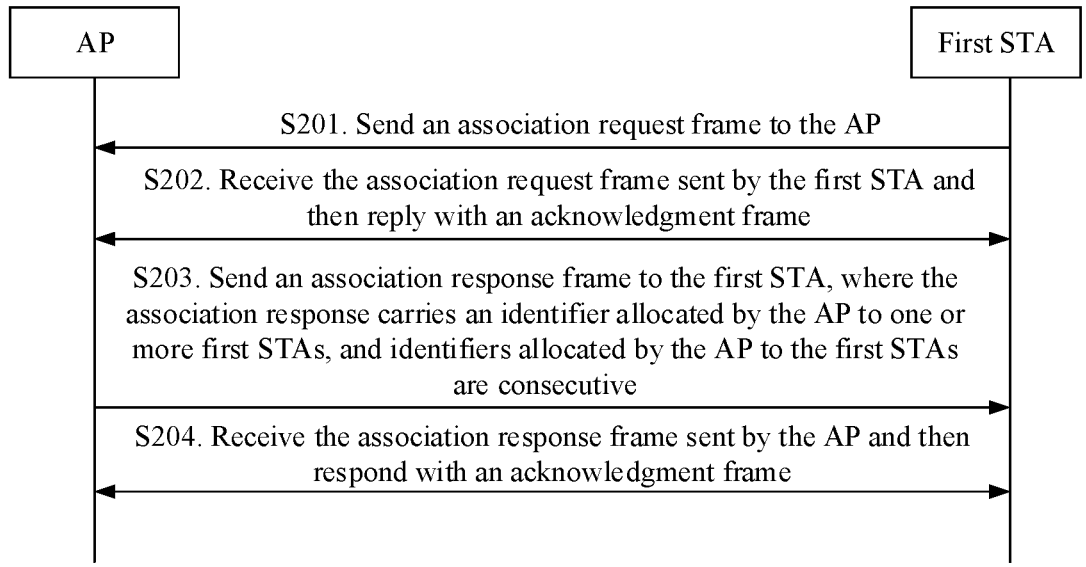
FIG. 4 is a signaling flowchart of another embodiment of a method for indicating downlink service data according to this application.

FIG. 4 is a signaling flowchart of another embodiment of a method for indicating downlink service data according to this application. This embodiment relates to a specific process in which an AP allocates consecutive identifiers to associated first STAs in an association process of STAs, to implement that an indication field of a wake-up beacon frame includes only downlink service data indications for the first STAs. On the basis of the foregoing embodiment, further, before step S101, the method may include the following steps.

S201. The first STA sends an association request frame to the AP.

S202. The AP receives the association request frame sent by the first STA and then replies with an acknowledgment frame.

S203. The AP sends an association response frame to the first STA, where the association response carries an identifier allocated by the AP to the first STA, and identifiers allocated by the AP to one or more first STAs are consecutive.

S204. The first STA receives the association response frame sent by the AP and then responds with an acknowledgment frame.

Specifically, in this application, the first STA sends the association request frame to the AP when associating with the AP, and the second STA also sends an association request frame to the AP when associating with the AP. The AP can identify whether a received association request frame is sent by a first STA or a second STA, and then send a corresponding association response to the first STA or the second STA, and carry an identifier of a corresponding STA in the association response. To be specific, the association response sent to the first STA carries an identifier of the first STA, and the association response sent to the second STA carries an identifier of the second STA. In this application, the identifiers allocated by the AP to the first STAs need to be consecutive. The identifiers of the first STAs are used to identify wake-up receivers of the STAs, and may be additional WUR identifiers allocated by the AP to the first STAs, or may be association identifiers (Association Identifier, AID for short) allocated by the AP to main radio (MR) of the first STAs.

There are two implementations to ensure that when the AP allocates an identifier to each STA, the identifiers allocated to the first STAs are consecutive.

Implementation 1: The AP allocates wake-up receiver identifiers (Wake Up Receiver ID, WID for short) to all the STAs equipped with the wake-up receivers, and uses the WIDs as identifiers of the STAs, and the AP may randomly allocate non-repeated WIDs to second STAs associated with the AP provided that the WIDs allocated to the first STA are consecutive.

Implementation 2: In this implementation, the AP directly uses the association identifiers (AID) of the MR of the first STAs as the WIDs of wake-up receivers of the first STAs, that is, when the AP allocates the AIDs to the MR of the first STAs, consecutively of the AIDs allocated to the MR of the first STAs is ensured, and the AP uses the AIDs of the MR of the first STAs as the identifiers of the first STAs, so that the identifiers of the first STAs are consecutive.

Optionally, the AP may separately allocate additional extreme low power wake-up receiver identifiers (Extreme Low Power WID, EWID for short) to the wake-up receivers of all the first STAs, these EWIDs are consecutive, and one EWID is corresponding to a WID of one first STA, thereby implementing that the wake-up receiver identifiers are consecutive. The indication field of the foregoing wake-up beacon frame periodically broadcast by the AP indicates, based on an order of the EWIDs, whether there are downlink service data for the first STAs, and the AP only needs to ensure that the EWIDs are consecutive.

The primary purpose of ensuring by the AP that the identifiers allocated to the first STAs are consecutive is to implement that the indication field of the wake-up beacon frame includes only the downlink service data indications for the first STAs. For a specific reason, refer to the description in the following embodiment. Before describing the reason, content of the indication field of the wake-up beacon frame is described first. In this embodiment, the indication field may specifically include a bitmap control field and a partial virtual bitmap field. Each bit in the partial virtual bitmap field is used to indicate whether there is downlink service data for a first STA corresponding to the bit, and an order of bits in the partial virtual bitmap field is the same as an order of the identifiers of corresponding first STAs. The bitmap control field is used to indicate an offset of a current first bit in the partial virtual bitmap field, and the offset is used to indicate a difference between an identifier of a first STA corresponding to the current first bit in the partial virtual bitmap field and an identifier of the 1st first STA.

The following uses a simple example to explain the reason why the AP needs to ensure that the identifiers allocated to the first STAs are consecutive. Each bit in the partial virtual bitmap field of the wake-up beacon frame is corresponding to one first STA. However, if the identifiers allocated by the AP to the first STAs are inconsecutive, it cannot be ensured that the first STAs can identify locations of downlink service data indication bits corresponding to the first STAs when the wake-up beacon frame includes only the downlink service data indication bits of the first STAs.

For example, it is assumed that the AP can manage a maximum of 2007 stations, a station whose identifier is WID1 is a first STA, stations whose identifiers are WID2 to WID2006 are second STAs, and a station whose identifier is WID2007 is a first STA, that is, the identifiers allocated by the AP to the first STAs are inconsecutive. Based on the structure of the TIM field of the 802.11 beacon frame, when a partial virtual bitmap field includes downlink service data indications for all the stations, each station knows a location of a bit corresponding to the station. However, for the wake-up beacon frame in this application, the partial virtual bitmap field of the wake-up beacon frame includes only the downlink service data indication bits of the first STAs, that is, the wake-up beacon frame includes only two indication bits corresponding to WID1 and WID2007. For the first STA whose identifier is WID1, the first STA can learn that the first bit is a downlink service data indication bit of the first STA. However, for the first STA whose identifier is WID2007, the first STA knows only that an indication bit corresponding to the first STA is the 2007th bit in the partial virtual bitmap field of the 802.11 beacon frame, but cannot learn that the second bit in the partial virtual bitmap field of the wake-up beacon frame is an indication bit corresponding to the first STA because the partial virtual bitmap field has no downlink service data indication bits of the second STAs whose identifiers are WID2 to WID2006.

Therefore, in this application, when allocating the identifiers to the first STAs, the AP needs to ensure that the identifiers of the first STAs are consecutive. That the identifiers of the first STAs are WIDs is still used as an example. It is assumed that a quantity of the first STAs associated with the AP is 100 and a quantity of second STAs is 1907, identifiers allocated by the AP to some second STAs are WID1 to WID7, identifiers allocated by the AP to the 100 first STAs are WID8 to WID107, and WID108 to WID2007 are identifiers of remaining second STAs. Based on the foregoing description of the structure of the wake-up beacon frame, each bit in the partial virtual bitmap field of the wake-up beacon frame is used to indicate whether there is downlink service data for the first STA corresponding to the bit, that is, the partial virtual bitmap field of the wake-up beacon frame includes only the downlink service data indication bits of all the first STAs. The bitmap control field is further introduced in the wake-up beacon frame, and the bitmap control field is used to indicate the offset of the current first bit in the partial virtual bitmap field. The offset is measured by using a byte, and the offset is used to indicate the difference between the identifier of the first STA corresponding to the current first bit in the partial virtual bitmap field and the identifier of a 1st first STA in the first STAs with consecutive identifiers. For example, if the offset is 0, the difference between the identifier of the first STA corresponding to the current first bit in the partial virtual bitmap field and the identifier (WID8) of the 1$^{st}$ first STA is 0, and the identifier of the first STA corresponding to the current first bit in the partial virtual bitmap field is WID8; or if the offset is 1, it indicates that the difference between the identifier of the first STA corresponding to the current first bit in the partial virtual bitmap field and the identifier (WID8) of the 1st first STA is 8, and the identifier of the first STA corresponding to the current first bit in the partial virtual bitmap field is WID16. Based on an identifier of a first STA corresponding to the first bit in the partial virtual bitmap field, another first STA can accurately learn of a location of a bit corresponding to the another first STA in the partial virtual bitmap field, and then accurately learn of whether the AP has downlink service data to be sent to the another first STA.

Based on the foregoing example, it can be learned that the AP allocates the consecutive identifiers to the first STAs associated with the AP, so that the first STAs can identify the locations of the downlink service data indication bits corresponding to the first STAs when receiving the wake-up beacon frame in this application. For example, if the partial virtual bitmap field of the wake-up beacon frame is "0110010010000000", and offsets in a partial virtual bitmap are 0s, it indicates that starting from WID8, there is downlink service data for stations whose identifiers are WID9, WID10, WID13, and WID16.

Optionally, because a basic service set (Basic Service Set, BSS for short) to which the first STA belongs may change in a sleep process of the MR of the first STA, the wake-up beacon frame may further include a BSS parameter of the first station (STA) when the MR of the first STA is in a sleep state. In addition, a clock is offset within sleep time because the first STA whose primary transceiver is in a sleep state but whose wake-up receiver is enabled uses hardware such as a low power clock oscillator, and therefore the wake-up beacon frame may further include clock synchronization information. Optionally, because the first STA whose primary transceiver is in a sleep state also needs the AP to periodically send, the wake-up beacon frame to notify the first STA that the first STA is still within a management range of the AP, the wake-up beacon frame may further include first indication information. The first indication information is used to indicate to the first STA that the first STA is currently within an association range of the AP, and this type of parameter is not only useful for the first STA, but also useful for the second STA.

According to the method for indicating downlink service data provided in this application, the AP allocates, by using the association response, the identifier to the first STA associated with the AP, and the identifiers allocated by the AP to all the first STAs are consecutive, so that when obtaining through listening the wake-up beacon frame including the bitmap control field and the partial virtual bitmap field, the first STA can learn of the offset of the bit in the partial virtual bitmap field based on the bitmap control field, then determine, based on the offset, the location of the indication bit corresponding to the first STA in the partial virtual bitmap field, and determine the identifier of the first STA corresponding to the first bit in the partial virtual bitmap field. This improves efficiency of identifying by the first STA the indication bit corresponding to the first STA. In addition, for indicating to the first STA whether the AP has downlink service data to be sent to the first STA, the MR of the first STA does not need to wake up within the second listen interval to receive the beacon frame broadcast by the AP, and only needs to be woken up by the WUR of the first STA when the WUR of the first STA learns, based on the wake-up beacon frame obtained through listening, that the AP has downlink service data to be sent to the first STA. This significantly reduces wake-up frequency of the MR and reduces power consumption of the first STA.

Another embodiment of this application provides a method for indicating downlink service data. A first STA in this embodiment sends listen interval information to an AP at an association stage by using an association request frame. The listen interval information includes a start point of a first listen interval and duration of the first listen interval, so that the AP can determine, based on the listen interval information, a lifecycle of downlink service data to be sent to the first STA, thereby better managing a data buffer space of the AP (certainly, the AP may reject the association request frame if the first listen interval in the listen interval information does not meet a requirement of the AP).

Figure 5:
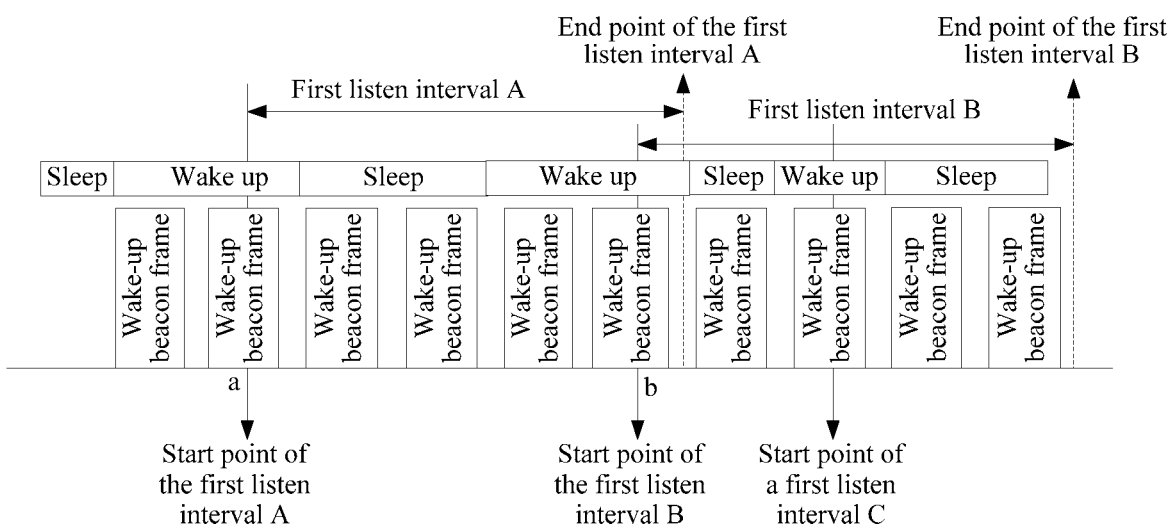
FIG. 5 is a schematic diagram of a first listen interval according to this application.

Specifically, the first listen interval in this embodiment is different from a listen interval (that is, the foregoing second listen interval) specified in a current 802.11 protocol. The start point of the first listen interval is time at which a WUR of the first STA receives a wake-up beacon frame for the last time during a last wake-up period, and the start point of the first listen interval plus the duration of the first listen interval equals an end point of the first listen interval. In this application, the first listen interval is used to indicate, to the AP, a frequency with which the wake-up receiver of the first STA wakes up to receive a wake-up beacon frame, that is, to indicate that the wake-up receiver of the first STA wakes up once within each first listen interval to receive a wake-up beacon frame. The wake-up receiver needs to wake up early enough to ensure that time at which the first wake-up beacon frame is received is within the first listen interval whose start point is "the time at which the last wake-up beacon frame is received during the last wake-up period of the wake-up receiver". A specific schematic diagram of the first listen interval is shown in FIG. 5. In FIG. 5, a start point of a first listen interval A is time at which the last wake-up beacon frame (that is, a wake-up beacon frame a in FIG. 5) is received by the WUR of the first STA during a last wake-up period, and the start point of the first listen interval A plus the duration of the first listen interval equals an end point of the first listen interval. Similarly, a start point of a first listen interval B is time at which the last wake-up beacon frame (that is, a wake-up beacon frame b in FIG. 5) is received by the WUR of the first STA during a last wake-up period.

Optionally, because the first STA is a station relatively sensitive to power consumption, that is, an extreme low power station, usually, a percentage of downlink service data sent by the AP to the first STA in entire transmitted service data is very small. Therefore, in this application, the first listen interval is extended on a basis of the original listen interval (that is, the foregoing second listen interval) in the 802.11 protocol. Duration of an extended first listen interval may be longer than duration of the second listen interval in the 802.11 protocol, so that the wake-up receiver of the first STA does not need to wake up frequently, and power consumption of the first STA is further reduced.

Specifically, in the current 802.11 protocol, two bytes are used to indicate a length of an 802.11 listen interval (that is, the foregoing second listen interval), and a basic unit of the 802.11 listen interval is a beacon frame sending interval. Two bytes include a total of 16 bits, that is, longest duration of the 802.11 listen interval may be $2^{16}-1=65535$ beacon frame sending intervals. If the beacon frame sending interval is 100 ms (the basic unit of the 802.11 listen interval is one beacon frame sending interval), the 802.11 listen interval is up to 6553.5 seconds.

In this application, a byte (or two bytes) of the first listen interval is divided into M normalized bits and N non-normalized bits, and optionally, M+N=16. A value corresponding to the M normalized bits (that is, a value converted from a binary system to a decimal system) is used to indicate a basic unit of the first listen interval. Optionally, the basic unit of the first listen interval is equal to a value of a normalization factor. Table 1 shows an example, and the normalization factor represents that several wake-up beacon frame sending intervals constitute the basic unit of the first listen interval. Certainly, the normalization factor may alternatively represent that several sending intervals of another frame constitute the basic unit of the first listen interval. This is not limited in this application, provided that the normalization factor enables the basic unit of the first listen interval to be greater than a basic unit of the second listen interval.

Table 1 is used as an example. In Table 1, there are two normalized bits, that is, M=2, N=14, and different values corresponding to the normalized bits represent different normalization factors. Certainly, the normalization factors corresponding to the values corresponding to the normalized bits in Table 1 are only examples. Based on the following Table 1, assuming that the normalized bits are 11, a value corresponding to the normalized bits is 3, and a normalization factor corresponding to the value corresponding to the normalized bits is 10,000 wake-up beacon frame sending intervals. To be specific, the basic unit of the first listen interval is equal to the 10,000 wake-up beacon frame sending intervals. Assuming that the wake-up beacon frame sending interval is 100 ms, the basic unit of the first listen interval=10,000×100 ms=1000 s.

TABLE 1

| Normalized bits | Value corresponding to the normalized bits | Normalization factor |
| --- | --- | --- |
| 00 | 0 | One wake-up beacon frame sending interval |
| 01 | 1 | 10 wake-up beacon frame sending intervals |
| 10 | 2 | 1000 wake-up beacon frame sending intervals |
| 11 | 3 | 10,000 wake-up beacon frame sending intervals |

For the N non-normalized bits, a value corresponding to the N non-normalized bits is used to indicate a quantity of basic units of the first listen interval. With reference to the normalization factor and a non-normalization interval, in this application, the duration of the first listen interval is equal to a product of the quantity of basic units of the first listen interval and the basic unit of the first listen interval. The foregoing Table 1 is still used as an example, and there are 14 non-normalized bits. Assuming that a sequence including these non-normalized bits is "11111111111111", a value of these non-normalized bits is equal to $2^{14}-1$, and the duration of the first listen interval provided in this application is equal to $(2^{14}-1)\times1000$ s.

According to the method for indicating downlink service data provided in this application, the first STA sends the listen interval information to the AP at the association stage by using the association request frame, and in the listen interval information, the start point of the first listen interval is the time at which the wake-up receiver of the first STA receives the wake-up beacon frame for the last time during the last wake-up period, so that the AP can determine, based on the listen interval information, the lifecycle of downlink service data to be sent to the first STA, thereby better managing the data buffer space of the AP. In addition, in this application, the duration of the original 802.11 listen interval (that is, the foregoing second listen interval) is extended, that is, in this application, the basic unit of the first listen interval is increased by using the categorized normalized bits, so that the duration of the first listen interval is increased, that is, the duration of the first listen interval provided in this application is greater than the duration of the 802.11 listen interval. Therefore, the wake-up receiver of the first STA does not need to wake up frequently, and power consumption of the first STA is further reduced.

FIG. 6 is a schematic flowchart of an embodiment of an information indication method according to this application. This embodiment relates to a specific process in which a first communications device determines, based on a wake-up report frame sent by a primary transceiver of a second communications device after the primary transceiver wakes up, whether wake-up of the second communications device is passive wake-up or active wake-up. In this embodiment, the first communications device may be an AP, or may be a station (STA), and the second communications device may be a STA, or may be an AP. When the first communications device is an AP, the second communications device is a STA. Alternatively, when the first communications device is a STA, the second communications device is an AP. The following embodiment describes the specific process of this embodiment by using an example in which the first communications device is an AP and the second communications device is a STA. As shown in FIG. 6, the method includes the following steps.

S301. The first communications device receives the wake-up report frame sent by the primary transceiver of the second communications device after the primary transceiver wakes up, where the wake-up report frame carries indication information, and the indication information is used to indicate, to the first communication device, that the primary transceiver of the second communications device is woken up by using a wake-up frame.

S302. The first communications device determines, based on the indication information, that the second communications device is woken up by using the wake-up frame.

Specifically, as described in the foregoing embodiment, wake-up of a STA is classified into active wake-up and passive wake-up. In either active wake-up or passive wake-up, the STA may send a wake-up report frame to an AP after waking up, and the wake-up report frame may be a PS-poll frame, an ACK frame, or the like. However, for the AP, at present, after receiving the wake-up report frame sent by the STA, the AP cannot learn, based on the wake-up report frame, whether wake-up of the STA is passive wake-up or active wake-up. Therefore, for this problem, the wake-up report frame sent by the STA to the AP carries indication information in this application, and the indication information is used to indicate, to the AP, that the STA is woken up by using a wake-up frame. Optionally, the wake-up frame may be sent by the AP to the STA, or may be sent, to the STA, by another station disguised as an AP. Either way, the AP can learn, based on the wake-up report frame, whether wake-up of the STA is passive wake-up or active wake-up, and more properly and effectively control data communication between the AP and the STA.

For the passive wake-up process (for the passive wake-up process, refer to FIG. 7A) mentioned above, this embodiment may also consider a case in which a station (attacker) disguised as an AP sends a wake-up frame to a wake-up receiver of a station, so that energy of the station is wasted because the wake-up receiver frequently instructs the station to trigger a primary transceiver of the station to wake up. For example, optionally, if an AP does not send a wake-up frame to any STA for a long period of time, but a STA sends a wake-up report frame to the AP during this period of time, and the wake-up report frame carries the indication information, the AP learns that the wake-up report frame from the STA is a response frame for a wake-up frame sent by a device (for example, an attacker), so that the AP determines that the STA may be currently attacked by a pseudo station.

Therefore, the AP may protect the station from attack in a specific manner, for example, changing an identifier of the wake-up receiver of the station or changing an encryption method of the wake-up frame.

To be distinguished from a PS-poll frame or an ACK frame sent by a station in a current protocol, the wake-up report frame in this application carries the indication information. Herein, a PS-poll frame is used as an example, and the indication information in the wake-up report frame may be carried in the following several manners.

Manner 1: The indication information that is provided in this application and that is carried in a PS-poll frame may be carried in a type and/or subtype subfield of a frame control field in a MAC header.

Manner 2: The indication information may alternatively be carried in an undefined subfield of a frame control field in a MAC header, so as to indicate that the wake-up report frame is a response frame for the wake-up frame. For example, the undefined subfield may be a "power management" bit in the frame control field in the MAC header of a PS-poll frame. When a value of the bit is 1, it indicates that the wake-up report frame is the response frame for the wake-up frame. A structure of the PS-poll frame is shown in FIG. 7B.

Manner 3: The indication information may be indicated by using a reserved value (which may also be referred to as a special value) of a field, for example, setting an association identifier field in a PS-poll frame to a special value. Usually, a bit 14 and a bit 15 in the association identifier field (which includes 16 bits in total from a bit 0 to the bit 15) each are set to 1. A value of the bit 0 to a bit 13 expressed in a decimal system needs to be within 1 to 2007, and 0 or 2008 to 16383, for example, are reserved values. Therefore, an association identifier value set outside a normal value range can indicate that the wake-up report frame is a response frame for the wake-up frame. For example, the bit 15 is set to 0, and other bits are randomly set (or carry other information, for example, carry characteristic information of a sender of the following wake-up frame).

According to the information indication method provided in this application, the second communications device sends, to the first communications device after waking up, the wake-up report frame that carries the indication information, and the first communications device may determine, based on the wake-up report frame, that the second communications device is woken up by using the wake-up frame, so that the first communications device can accurately learn of an attribute of an awake state of the second communications device, and more properly and effectively control data communication between the first communications device and the second communications device. Further, the indication information in the wake-up report frame may also implicitly enable the first communications device to determine, based on the awake state of the second communications device, whether the second communications device is attacked, so that the first communications device can respond with protection measures in time to prevent the MR from waking up by mistake when the second communications device is attacked again, thereby saving energy of the second communications device.

Further, on the basis of the foregoing embodiment, the wake-up report frame includes characteristic information of the wake-up frame. The characteristic information of the wake-up frame is used to indicate, to the AP, a device that sends the wake-up frame. Therefore, after step S302, the method may further include the following steps:

The first communications device determines, based on the characteristic information of the wake-up frame, whether the wake-up frame is a wake-up frame sent by the first communications device.

Specifically, in this embodiment, the wake-up frame received by a wake-up receiver of the second communications device may be sent by the AP, or may be sent by a pseudo station. Therefore, the characteristic information that is of the wake-up frame and that is carried in the wake-up report frame is used to indicate, to the AP, a sending device that sends a wake-up frame to which the foregoing wake-up report frame responds or a wake-up frame to which the foregoing wake-up report frame responds. After receiving the wake-up report frame sent by the station, the AP can learn, based on the characteristic information of the wake-up frame, whether the current wake-up report frame responds to the wake-up frame sent by the AP to the station. If the AP determines that the characteristic information of the wake-up frame carried in the wake-up report frame does not match characteristic information of the AP, that is, determines that the wake-up frame to which the wake-up report frame responds is not sent by the AP, the AP determines that the station is attacked by a pseudo station, and the AP may protect the station from attack in a specific manner, for example, changing an identifier of the wake-up receiver of the station, or changing an encryption method of the wake-up frame. Optionally, the characteristic information may be carried in, for example, some bits of a MAC address of a sender of the wake-up frame, or may be carried in some bits of a frame check sequence (or a cyclic redundancy check bit) of the wake-up frame to which the wake-up report frame responds. That the wake-up report frame is a PS-poll frame is used as an example, and the some bits of the MAC address of the sender of the wake-up frame or the some bits of the frame check sequence of the wake-up frame to which the wake-up report frame responds may be carried in an association identifier field of the PS-poll frame.

According to the information indication method provided in this embodiment, the wake-up report frame sent to the first communications device carries the indication information and the characteristic information of the wake-up frame, so that the first communications device can learn, based on the wake-up report frame, whether the second communications device that currently sends the wake-up report frame is attacked by a pseudo station, and after determining that the station that sends the wake-up report frame is attacked by a pseudo station, the first communications device responds with protection measures in time to prevent the MR from waking up by mistake when the second communications device is attacked again, thereby saving energy of the second communications device.

FIG. 8 is a schematic structural diagram of a station according to an embodiment of this application. In this embodiment, the station is a first STA of a station associated with an AP. The first STA may be implemented in a form of software, hardware, or a combination of software and hardware. As shown in FIG. 8, the first STA includes a control module 10, a first receiving module 11, and a determining module 12.

The control module 10 is configured to control a wake-up receiver of the first STA to wake up within a preset first listen interval.

The first receiving module 11 is configured to receive, after the wake-up receiver of the first STA wakes up, a wake-up beacon frame sent by the AP, where the wake-up beacon frame includes an indication field used to indicate whether the AP has downlink service data to be sent to the first STA.

The control module 10 is further configured to control main radio (MR) of the first STA not to wake up within a second listen interval to receive a beacon frame sent by the AP.

The determining module 12 is configured to determine, based on the indication field, whether the AP has downlink service data to be sent to the first STA.

Optionally, the first receiving module 11 may be the wake-up receiver of the first STA, or may be a module integrated into the wake-up receiver of the first STA. The control module 10 and the determining module 12 may be elements with control and processing functions such as a processor of the first STA.

Figure 9:
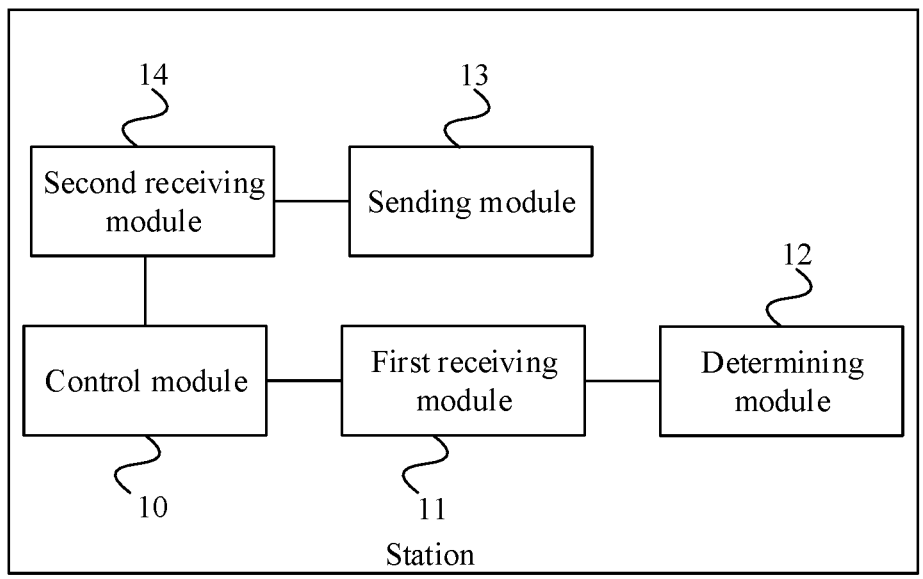
FIG. 9 is a schematic structural diagram of a station according to another embodiment of this application.

On the basis of the foregoing embodiment in FIG. 8, further, FIG. 9 is a schematic structural diagram of a station according to another embodiment of this application. As shown in FIG. 9, the first STA may further include a sending module 13 and a second receiving module 14.

The sending module 13 is configured to send an association request frame to the AP.

The second receiving module 14 is configured to receive an association response sent by the AP, where the association response carries an identifier allocated by the AP to the first STA, and identifiers allocated by the AP to one or more STAs are consecutive.

Optionally, the sending module 13 and the second receiving module 14 may be the MR of the first STA, that is, the sending module 13 may be corresponding to a primary transmitter of the MR of the first STA, and the second receiving module 14 may be corresponding to a primary receiver of the MR of the first STA.

Optionally, the indication field specifically includes a bitmap control field and a partial virtual bitmap field;
  each bit in the partial virtual bitmap field is used to indicate whether there is downlink service data for a first STA corresponding to the bit; and
  the bitmap control field is used to indicate an offset of a current first bit in the partial virtual bitmap field, where the offset is used to indicate a difference between an identifier of a first STA corresponding to the current first bit in the partial virtual bitmap field and an identifier of the 1st first STA.

Optionally, the identifier of the first STA includes any one of an identifier of the wake-up receiver of the first STA, and an association identifier of the main radio (MR) of the first STA.

Optionally, a start point of the first listen interval is time at which the wake-up receiver of the first STA receives the wake-up beacon frame for the last time during a last wake-up period.

Optionally, one or more bytes indicating the first listen interval includes M normalized bits and N non-normalized bits, where a value corresponding to the M normalized bits is used to indicate a basic unit of the first listen interval, and a value corresponding to the N non-normalized bits is used to indicate a quantity of basic units of the first listen interval; and
  duration of the first listen interval is equal to a product of the quantity of basic units of the first listen interval and the basic unit of the first listen interval.

The station provided in this application can execute the foregoing embodiments of the method for indicating downlink service data, and implementation principles and technical effects of the station are similar to those of the method. Details are not described herein again.

Figure 10:
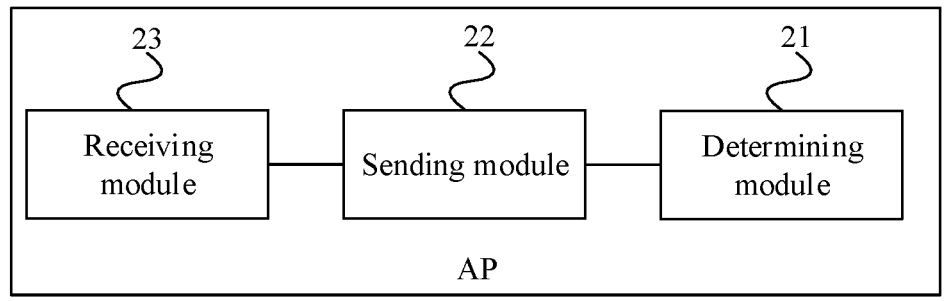
FIG. 10 is a schematic structural diagram of an AP according to an embodiment of this application.

FIG. 10 is a schematic structural diagram of an AP according to an embodiment of this application. The AP may be implemented in a form of software, hardware, or a combination of software and hardware. As shown in FIG. 10, the AP includes a determining module 21 and a sending module 22.

Specifically, the determining module 21 is configured to determine a station (STA) that is associated with the AP and that is equipped with a wake-up receiver, where the STA includes a first STA.

The sending module 22 is configured to periodically send a wake-up beacon frame to the wake-up receiver of the STA, where the wake-up beacon frame includes an indication field used to indicate whether the AP has downlink service data to be sent to the first STA.

Optionally, the determining module 21 may be corresponding to an element with a processing function or control function such as a processor or controller of the AP, and the sending module 22 may be corresponding to a primary transmitter of MR of the AP.

On the basis of the embodiment in FIG. 10, the AP may further include a receiving module 23. The receiving module 23 is configured to receive an association request frame sent by the first STA. The sending module 22 is further configured to send an association response to the first STA, where the association response carries an identifier allocated by the AP to the first STA, and identifiers allocated by the AP to one or more STAs are consecutive.

Optionally, the indication field specifically includes a bitmap control field and a partial virtual bitmap field;
each bit in the partial virtual bitmap field is used to indicate whether there is downlink service data for a first STA corresponding to the bit; and
the bitmap control field is used to indicate an offset of a current first bit in the partial virtual bitmap field, where the offset is used to indicate a difference between an identifier of a first STA corresponding to the current first bit in the partial virtual bitmap field and an identifier of the $1^{st}$ first STA in the first STAs with consecutive identifiers.

Optionally, the identifier of the first STA includes any one of an identifier of a wake-up receiver of the first STA, and an association identifier of main radio (MR) of the first STA.

Optionally, the receiving module 23 is further configured to receive listen interval information sent by the first STA, where the listen interval information includes a start point of a first listen interval and duration of the first listen interval, and the start point of the first listen interval is time at which the wake-up receiver of the first STA receives the wake-up beacon frame for the last time during a last wake-up period.

Optionally, one or more bytes indicating the first listen interval includes M normalized bits and N non-normalized bits, where a value corresponding to the M normalized bits is used to indicate a basic unit of the first listen interval, and a value corresponding to the N non-normalized bits is used to indicate a quantity of basic units of the first listen interval; and
the duration of the first listen interval is equal to a product of the quantity of basic units of the first listen interval and the basic unit of the first listen interval.

The AP provided in this application can execute the foregoing embodiments of the method for indicating downlink service data, and implementation principles and technical effects of the AP are similar to those of the method. Details are not described herein again.

Figure 11:
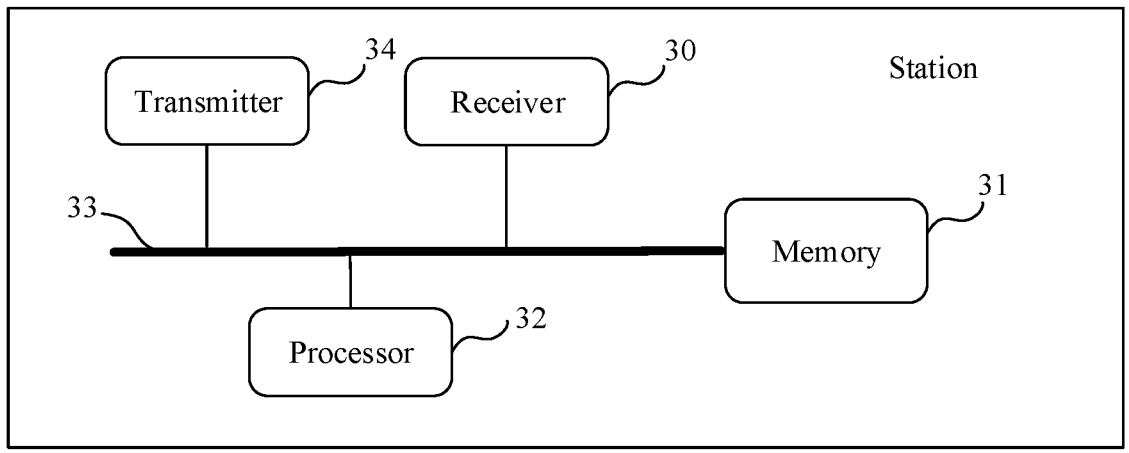
FIG. 11 is a schematic structural diagram of a station according to another embodiment of this application.

FIG. 11 is a schematic structural diagram of a station according to another embodiment of this application. As shown in FIG. 11, the station is a first STA of a station associated with an AP, and the station may include a receiver 30, a memory 31, a processor 32, and at least one communications bus 33. The communications bus 33 is configured to implement a communication connection between elements. The memory 31 may include a high-speed RAM memory, and may further include a nonvolatile memory (NVM), for example, at least one magnetic disk memory. The memory 31 may store various programs, to implement various processing functions and implement the method steps in the embodiments. Optionally, the station may further include a transmitter 34. In this embodiment, the receiver 30 may be a wake-up receiver of the first STA, and the transmitter 34 may be a primary transmitter of MR of the first STA.

Specifically, in this embodiment, the processor 32 is configured to control the wake-up receiver of the first STA to wake up within a preset first listen interval;
the receiver 30 is configured to receive, after the first STA wakes up, a wake-up beacon frame sent by the AP, where the wake-up beacon frame includes an indication field used to indicate whether the AP has downlink service data to be sent to the first STA; and
the processor 32 is further configured to: control the main radio (MR) of the first STA not to wake up within a second listen interval to receive a beacon frame sent by the AP, and determine, based on the indication field, whether the AP has downlink service data to be sent to the first STA.

Optionally, the transmitter 34 is configured to send an association request frame to the AP; and
the receiver 30 is further configured to receive an association response sent by the AP, where the association response carries an identifier allocated by the AP to the first STAs, and identifiers allocated by the AP to one or more first STAs are consecutive. Optionally, in this optional manner, the receiver 30 may alternatively be a primary receiver of the MR of the first STA.

Optionally, the indication field specifically includes a bitmap control field and a partial virtual bitmap field;
each bit in the partial virtual bitmap field is used to indicate whether there is downlink service data for a first STA corresponding to the bit; and
the bitmap control field is used to indicate an offset of a current first bit in the partial virtual bitmap field, where the offset is used to indicate a difference between an identifier of a first STA corresponding to the current first bit in the partial virtual bitmap field and an identifier of the $1^{st}$ first STA in the first STAs with consecutive identifiers.

Optionally, the identifier of the first STA includes any one of an identifier of the wake-up receiver of the first STA, and an association identifier of the main radio (MR) of the first STA.

Optionally, a start point of the first listen interval is time at which the wake-up receiver of the first STA receives the wake-up beacon frame for the last time during a last wake-up period.

Optionally, one or more bytes indicating the first listen interval includes M normalized bits and N non-normalized bits, where a value corresponding to the M normalized bits is used to indicate a basic unit of the first listen interval, and a value corresponding to the N non-normalized bits is used to indicate a quantity of basic units of the first listen interval; and duration of the first listen interval is equal to a product of the quantity of basic units of the first listen interval and the basic unit of the first listen interval.

The station provided in this application can execute the foregoing embodiments of the method for indicating downlink service data, and implementation principles and technical effects of the station are similar to those of the method. Details are not described herein again.

Figure 12:
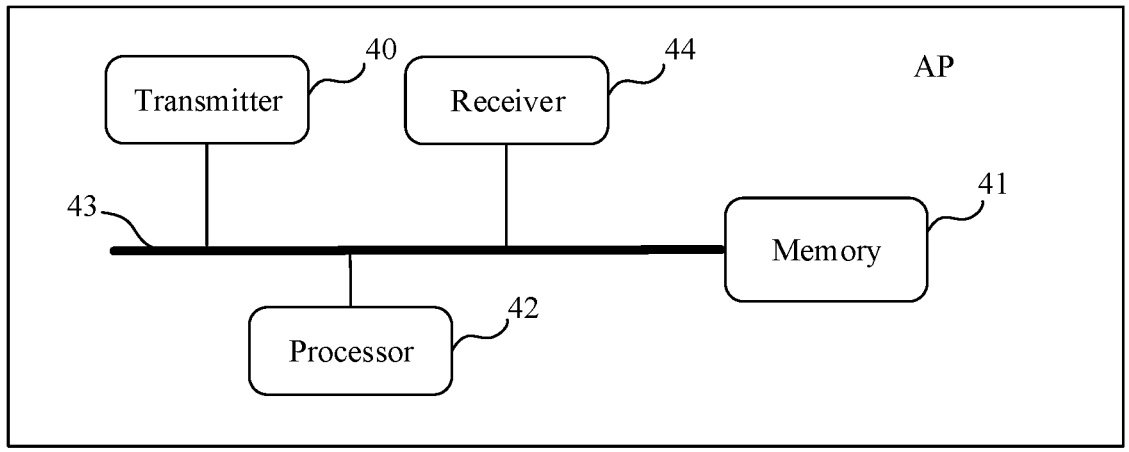
FIG. 12 is a schematic structural diagram of an AP according to another embodiment of this application.

FIG. 12 is a schematic structural diagram of an AP according to another embodiment of this application. As shown in FIG. 12, the AP may include a transmitter 40, a memory 41, a processor 42, and at least one communications bus 43. The communications bus 43 is configured to implement a communication connection between elements. The memory 41 may include a high-speed RAM memory, and may further include a nonvolatile memory (NVM), for example, at least one magnetic disk memory. The memory 41 may store various programs, to implement various processing functions and implement the method steps in the embodiments. Optionally, the AP may further include a receiver 44. In this embodiment, the transmitter 40 may be a primary transmitter of MR of the AP, and the receiver 44 may be a primary receiver of the MR of the AP.

Specifically, in this embodiment, the processor 42 is configured to determine a station (STA) that is associated with the AP and that is equipped with a wake-up receiver, where the STA includes a first STA; and the transmitter 40 is configured to periodically send a wake-up beacon frame to the wake-up receiver of the STA, where the wake-up beacon frame includes an indication field used to indicate whether the AP has downlink service data to be sent to the first STA.

Optionally, the receiver 44 is configured to receive an association request frame sent by the first STA; and the transmitter 40 is further configured to send an association response to the first STA, where the association response carries an identifier allocated by the AP to the first STA, and identifiers allocated by the AP to one or more first STAs are consecutive.

Optionally, the indication field specifically includes a bitmap control field and a partial virtual bitmap field;
  each bit in the partial virtual bitmap field is used to indicate whether there is downlink service data for a first STA corresponding to the bit; and
  the bitmap control field is used to indicate an offset of a current first bit in the partial virtual bitmap field, where the offset is used to indicate a difference between an identifier of a first STA corresponding to the current first bit in the partial virtual bitmap field and an identifier of the $1^{st}$ first STA in the first STAs with consecutive identifiers.

Optionally, the identifier of the first STA includes any one of an identifier of a wake-up receiver of the first STA, and an association identifier of main radio (MR) of the first STA.

Optionally, the receiver 44 is further configured to receive listen interval information sent by the first STA, where the listen interval information includes a start point of a first listen interval and duration of the first listen interval, and the start point of the first listen interval is time at which the wake-up receiver of the first STA receives the wake-up beacon frame for the last time during a last wake-up period.

Optionally, one or more bytes indicating the first listen interval includes M normalized bits and N non-normalized bits, where a value corresponding to the M normalized bits is used to indicate a basic unit of the first listen interval, and a value corresponding to the N non-normalized bits is used to indicate a quantity of basic units of the first listen interval; and
  the duration of the first listen interval is equal to a product of the quantity of basic units of the first listen interval and the basic unit of the first listen interval.

The AP provided in this application can execute the foregoing embodiments of the method for indicating downlink service data, and implementation principles and technical effects of the AP are similar to those of the method. Details are not described herein again.

Figure 13:
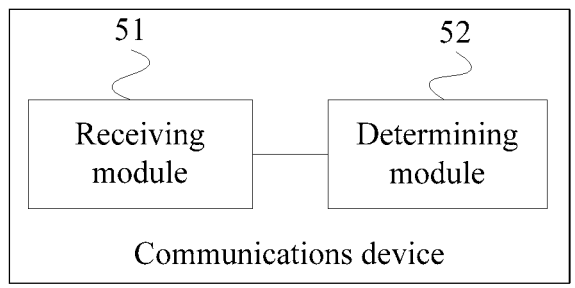
FIG. 13 is a schematic structural diagram of a communications device according to an embodiment of this application.

FIG. 13 is a schematic structural diagram of a communications device according to an embodiment of this application. The communications device may be the first communications device in the foregoing method embodiment. As shown in FIG. 13, the first communications device includes a receiving module 51 and a determining module 52.

The receiving module 51 is configured to receive a wake-up report frame sent by a primary transceiver of a second communications device after the primary transceiver wakes up, where the wake-up report frame carries indication information, and the indication information is used to indicate, to the AP, that the primary transceiver of the second communications device is woken up by using a wake-up frame.

The determining module 52 is configured to determine, based on the indication information, that the second communications device is woken up by using the wake-up frame.

Optionally, the receiving module 51 may be a primary transceiver of the first communications device, and the determining module 52 may be an element with a processing function or a control function such as a processor or a controller of the first communications device.

Further, the wake-up report frame includes characteristic information of the wake-up frame, and the determining module 52 is further configured to determine, based on the characteristic information of the wake-up frame, whether the wake-up frame is a wake-up frame sent by the first communications device.

The communications device provided in this application can execute the foregoing method embodiment in FIG. 6, and implementation principles and technical effects of the communications device are similar to those of the method. Details are not described herein again.

Figure 14:
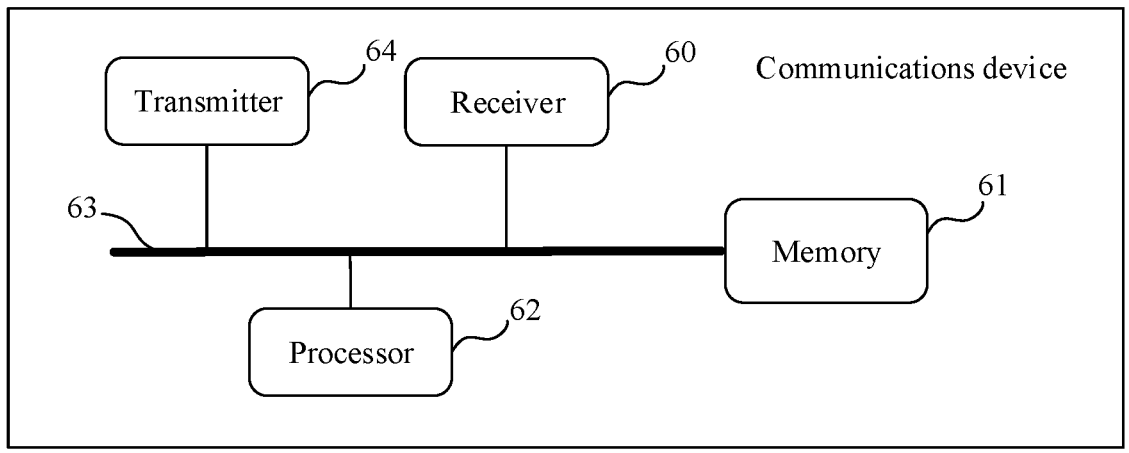
FIG. 14 is a schematic structural diagram of a communications device according to another embodiment of this application.

FIG. 14 is a schematic structural diagram of a communications device according to another embodiment of this application. The communications device is the first communications device in the foregoing method embodiment. As shown in FIG. 14, the first communications device may include a receiver 60, a memory 61, a processor 62, and at least one communications bus 63. The communications bus 63 is configured to implement a communication connection between elements. The memory 61 may include a high-speed RAM memory, and may further include a nonvolatile memory (NVM), for example, at least one magnetic disk memory. The memory 61 may store various programs, to implement various processing functions and implement the method steps in the embodiments. Optionally, the communication device may further include a transmitter 64. In this embodiment, the receiver 60 may be a primary receiver of MR of the communications device, and the transmitter 64 may be a primary transmitter of the MR of the communications device.

Specifically, in this embodiment, the receiver 60 is configured to receive a wake-up report frame sent by a primary transceiver of a second communications device after the primary transceiver wakes up, where the wake-up report frame carries indication information, and the indication information is used to indicate, to the AP, that the primary transceiver of the second communications device is woken up by using a wake-up frame; and the processor 62 is configured to determine, based on the indication information, that the second communications device is woken up by using the wake-up frame.

Optionally, the wake-up report frame further includes characteristic information of the wake-up frame; and the processor 62 is further configured to determine, based on the characteristic information of the wake-up frame, whether the wake-up frame is a wake-up frame sent by the first communications device.

The communications device provided in this application can execute the foregoing embodiment of the information indication method, and implementation principles and technical effects of the communications device are similar to those of the method. Details are not described herein again.

Method or algorithm steps described with reference to the content disclosed in this application may be implemented by hardware, or may be implemented by a processor by executing a software instruction, or may be implemented by a computer program product. The software instruction may include a corresponding software module. The software module may be located in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may be a constituent component of the processor. The processor and the storage medium may be located in an ASIC. In addition, the ASIC may be located in user equipment. Certainly, the processor and the storage medium may exist in the user equipment as discrete components.

A person skilled in the art should be aware that in the foregoing one or more examples, the functions described in this application may be implemented by hardware, software, firmware, or any combination thereof. When the functions are implemented by software, the functions may be stored in a computer readable medium or transmitted as one or more instructions or code in the computer readable medium. The computer readable medium includes a computer storage medium and a communications medium. The communications medium includes any medium that enables a computer program to be transmitted from one place to another. The storage medium may be any available medium accessible to a general-purpose or dedicated computer.

In the several embodiments provided in this application, it should be understood that the disclosed system, device, and method may be implemented in other manners without departing from the scope of this application. For example, the described embodiment is merely an example. For example, the module or unit division is merely logical function division and may be other division in actual implementation. For example, a plurality of units or components may be combined or integrated into another system, or some features may be ignored or not performed. The units described as separate parts may or may not be physically separate. Parts displayed as units may or may not be physical units, and may be located in one position, or may be distributed on a plurality of network units. Some or all of the modules may be selected depending on actual needs to achieve the objectives of the solutions of the embodiments.

In addition, the schematic diagrams illustrating the system, device, method and different embodiments may be combined or integrated with other systems, modules, technologies, or methods without departing from the scope of this application. In addition, the displayed or discussed mutual couplings or direct couplings or communication connections may be implemented by using some interfaces. The indirect couplings or communication connections between the apparatuses or units may be implemented in electrical, mechanical, or other forms.

What is claimed is:

1. A method for indicating downlink service data, the method comprising:
    sending, by a first station (STA), a request frame to a wireless access point (AP), wherein the request frame comprises listen interval information, the listen interval information comprises a duration of a first listen interval, the duration of the first listen interval is equal to a product of a quantity of basic units of the first listen interval and a basic unit of the first listen interval, and the first STA is equipped with a main radio and a wake-up receiver;
    receiving, by the first STA, a response frame sent by the AP, wherein the response frame carries an identity allocated by the AP to the first STA, and the identity of the first STA comprises an identity of the wake-up receiver of the first STA;
    controlling, by the first STA associated with the AP, the wake-up receiver of the first STA to wake up within the first listen interval; and
    receiving, by the first STA, a wake-up beacon frame periodically sent by the AP.

2. The method according to claim 1, wherein the listen interval information further comprises a start point of the first listen interval.

3. The method according to claim 1, wherein the identity of the first STA further comprises an association identifier of the main radio of the first STA.

4. The method according to claim 1, wherein the method further comprises:
    controlling, by the first STA, the main radio of the first STA not to wake up within a second listen interval to receive a beacon frame sent by the AP.

5. The method according to claim 4, wherein:
    the wake-up beacon frame comprises an indication field used to indicate whether the AP has downlink service data to be sent to the first STA; and
    the method further comprises:
        determining, by the first STA based on the indication field, whether the AP has downlink service data to be sent to the first STA.

6. A method for indicating downlink service data, the method comprising:
    receiving, by a wireless access point (AP), a request frame sent by a first station (STA), wherein the request frame comprises listen interval information, the listen interval information comprises a duration of a first listen interval, the duration of the first listen interval is equal to a product of a quantity of basic units of the first listen interval and a basic unit of the first listen interval, and the first STA is equipped with a main radio and a wake-up receiver;
    sending, by the AP, a response frame to the first STA, wherein the response frame carries an identity allocated by the AP to the first STA, and the identity of the first STA comprises an identity of the wake-up receiver of the first STA; and determining, by the AP, STAs that are associated with the AP and that are equipped with wake-up receivers, wherein the STAs comprise the first STA; and periodically sending, by the AP, a wake-up beacon frame to the wake-up receivers of the STAs.

7. The method according to claim 6, wherein the listen interval information further comprises a start point of the first listen interval.

8. The method according to claim 6, wherein the identity of the first STA further comprises an association identifier of the main radio of the first STA.

9. The method according to claim 6, wherein the wake-up beacon frame comprises an indication field used to indicate whether the AP has downlink service data to be sent to the first STA.

10. A station (STA), wherein the STA is a first STA in stations associated with a wireless access point (AP), the first STA is equipped with a main radio and a wake-up receiver, and the first STA comprises:
a transmitter, configured to send a request frame to the AP, wherein the request frame comprises listen interval information, the listen interval information comprises a duration of a first listen interval, the duration of the first listen interval is equal to a product of a quantity of basic units of the first listen interval and a basic unit of the first listen interval;
a receiver, configured to receive a response frame sent by the AP, wherein the response frame carries an identity allocated by the AP to the first STA, and the identity of the first STA comprises an identity of the wake-up receiver of the first STA; and
at least one processor; and
one or more memories coupled to the at least one processor and storing program instructions for execution by the at least one processor to control the wake-up receiver of the first STA to wake up within the first listen interval;
wherein the receiver is configured to receive a wake-up beacon frame periodically sent by the AP.

11. The station according to claim 10, wherein the listen interval information further comprises a start point of the first listen interval.

12. The station according to claim 10, wherein the identity of the first STA further comprises an association identifier of the main radio of the first STA.

13. The station according to claim 10, wherein the one or more memories stores the program instructions for execution by the at least one processor to control the main radio of the first STA not to wake up within a second listen interval to receive a beacon frame sent by the AP.

14. The station according to claim 13, wherein:
the wake-up beacon frame comprises an indication field used to indicate whether the AP has downlink service data to be sent to the first STA; and the one or more memories stores the program instructions for execution by the at least one processor to determine, based on the indication field, whether the AP has downlink service data to be sent to the first STA.

15. An access point (AP), comprising:
a receiver, configured to receive a request frame sent by a first station (STA), wherein the request frame comprises listen interval information, the listen interval information comprises a duration of a first listen interval, the duration of the first listen interval is equal to a product of a quantity of basic units of the first listen interval and a basic unit of the first listen interval, and the first STA is equipped with a main radio and a wake-up receiver;
a transmitter, configured to send a response frame to the first STA, wherein the response frame carries an identity allocated by the AP to the first STA, and the identity of the first STA comprises an identity of the wake-up receiver of the first STA; and
at least one processor; and
one or more memories coupled to the at least one processor and storing program instructions for execution by the at least one processor to determine STAs that are associated with the AP and that are equipped with wake-up receivers, wherein the STAs comprise the first STA;
wherein the transmitter is further configured to periodically send a wake-up beacon frame to the wake-up receivers of the STAs.

16. The AP according to claim 15, wherein the listen interval information further comprises a start point of the first listen interval.

17. The AP according to claim 15, wherein the identity of the first STA further comprises an association identifier of the main radio of the first STA.

18. The AP according to claim 15, wherein the wake-up beacon frame comprises an indication field used to indicate whether the AP has downlink service data to be sent to the first STA.

19. The AP according to claim 18, wherein:
the indication field comprises a bitmap control field and a partial virtual bitmap field;
each bit in the partial virtual bitmap field is used to indicate whether there is downlink service data for a first STA corresponding to the bit; and
the bitmap control field is used to indicate an offset of a bit in the partial virtual bitmap field, and the offset is used to indicate a difference between an identity of a first STA corresponding to a current first bit in the partial virtual bitmap field and an identity of the first STA.

20. The AP according to claim 15, wherein a start point of the first listen interval is a transmission time at which the wake-up receiver of the first STA receives a wake-up beacon frame for a last time during a last wake-up period.

* * * * *